US012634733B2

(12) United States Patent
Zhang et al.

(10) Patent No.: US 12,634,733 B2
(45) Date of Patent: May 19, 2026

(54) METHOD FOR MOBILE NODE TO OBTAIN NEIGHBOR NODE SYNCHRONIZATION SIGNAL BLOCK (SSB) TRANSMISSION CONFIGURATION (STC)

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Junyi Li, Fairless Hills, PA (US); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 418 days.

(21) Appl. No.: 17/823,267

(22) Filed: Aug. 30, 2022

(65) Prior Publication Data

US 2024/0073834 A1 Feb. 29, 2024

(51) Int. Cl.
| | |
|---|---|
| *H04W 24/08* | (2009.01) |
| *H04W 24/10* | (2009.01) |
| *H04W 56/00* | (2009.01) |
| *H04W 84/02* | (2009.01) |
| *H04W 88/02* | (2009.01) |
| *H04W 88/08* | (2009.01) |
| *H04W 88/12* | (2009.01) |

(Continued)

(52) U.S. Cl.
CPC ........... *H04W 24/10* (2013.01); *H04W 24/08* (2013.01); *H04W 56/0015* (2013.01);
(Continued)

(58) Field of Classification Search
CPC ..... H04B 7/02–17; H04B 17/0082–409; H04J 11/0023–0093; H04J 2011/0003–0096;

H04L 5/0001–26; H04W 8/22–245; H04W 24/02–10; H04W 28/02–26; H04W 36/0005–385; H04W 40/005–38; H04W 48/02–20; H04W 56/001–0025; H04W 72/02–569;

(Continued)

(56) References Cited

U.S. PATENT DOCUMENTS

| | | | |
|---|---|---|---|
| 2021/0152306 A1* | 5/2021 | Liu | ..................... H04W 84/047 |
| 2021/0185550 A1 | 6/2021 | Abedini et al. | |

(Continued)

FOREIGN PATENT DOCUMENTS

| | | |
|---|---|---|
| CA | 3196490 A1 | 4/2022 |
| WO | 2021034256 A1 | 2/2021 |

(Continued)

OTHER PUBLICATIONS

Partial International Search Report—PCT/US2023/072660—ISA/EPO—Dec. 19, 2023.

(Continued)

*Primary Examiner* — Timothy J Weidner

(74) *Attorney, Agent, or Firm* — QUALCOMM Incorporated

(57) ABSTRACT

Certain aspects of the present disclosure provide a method for wireless communications by a first network entity. The first network entity obtains a synchronization signal block (SSB) transmission configuration (STC) of a second network entity. The first network entity measures one or more SSBs transmitted from the second network entity in accordance with the STC configuration.

21 Claims, 23 Drawing Sheets

(51) Int. Cl.

| | |
|---|---|
| *H04W 92/02* | (2009.01) |
| *H04W 92/10* | (2009.01) |
| *H04W 92/12* | (2009.01) |
| *H04W 92/18* | (2009.01) |
| *H04W 92/20* | (2009.01) |

(52) U.S. Cl.
CPC ........ *H04W 56/0025* (2013.01); *H04W 84/02* (2013.01); *H04W 88/02* (2013.01); *H04W 88/08* (2013.01); *H04W 88/12* (2013.01); *H04W 92/02* (2013.01); *H04W 92/10* (2013.01); *H04W 92/12* (2013.01); *H04W 92/18* (2013.01); *H04W 92/20* (2013.01)

(58) Field of Classification Search
CPC ........... H04W 74/002–006; H04W 84/005–22; H04W 88/005–188; H04W 92/02–24
See application file for complete search history.

(56) References Cited

U.S. PATENT DOCUMENTS

| | | | |
|---|---|---|---|
| 2022/0086660 A1 | 3/2022 | Akl et al. | |
| 2022/0167254 A1* | 5/2022 | Miao ..................... | H04W 56/00 |
| 2022/0217661 A1 | 7/2022 | Yokomakura et al. | |
| 2022/0256485 A1 | 8/2022 | Dortschy et al. | |
| 2023/0007523 A1 | 1/2023 | Fu | |
| 2023/0064251 A1* | 3/2023 | Korhonen ............. | H04W 48/16 |
| 2023/0130178 A1* | 4/2023 | Zhuo ................. | H04W 36/0064 |

FOREIGN PATENT DOCUMENTS

| | | |
|---|---|---|
| WO | 2021179181 A1 | 9/2021 |
| WO | 2022151270 A1 | 7/2022 |

OTHER PUBLICATIONS

Ericsson: "IAB Rel-17 Corrections", 3GPP TSG-RAN WG3 Meeting #116-e, R3-223119, 3rd Generation Partnership Project, Mobile Competence Centre, 650, Route Des Lucioles, F-06921 Sophia-Antipolis Cedex, France, vol. RAN WG3, No. Online, May 9, 2022-May 19, 2022, Apr. 26, 2022, XP052142994, 146 pages, Section 8.5.4, pp. 4, 5.
International Search Report and Written Opinion—PCT/US2023/072660—ISA/EPO—Mar. 15, 2024.

\* cited by examiner

| gNB | UE | Comments |
|---|---|---|
| FD Disabled | FD Disabled | Baseline Operation |
| FD Disabled | FD Enabled | Use Case 1 for mTRP |
| FD Enabled | FD Disabled | Use Case 2 and IAB |
| FD Enabled | FD Enabled | Use Case 3 |

*FIG. 9*

Scenario 0:  FD gNB & HD UE

Scenario 1: FD gNB & FD UE/CPE

Scenario 2:   HD gNB (e.g., M-TRP) & FD UE/CPE

Figure 13:
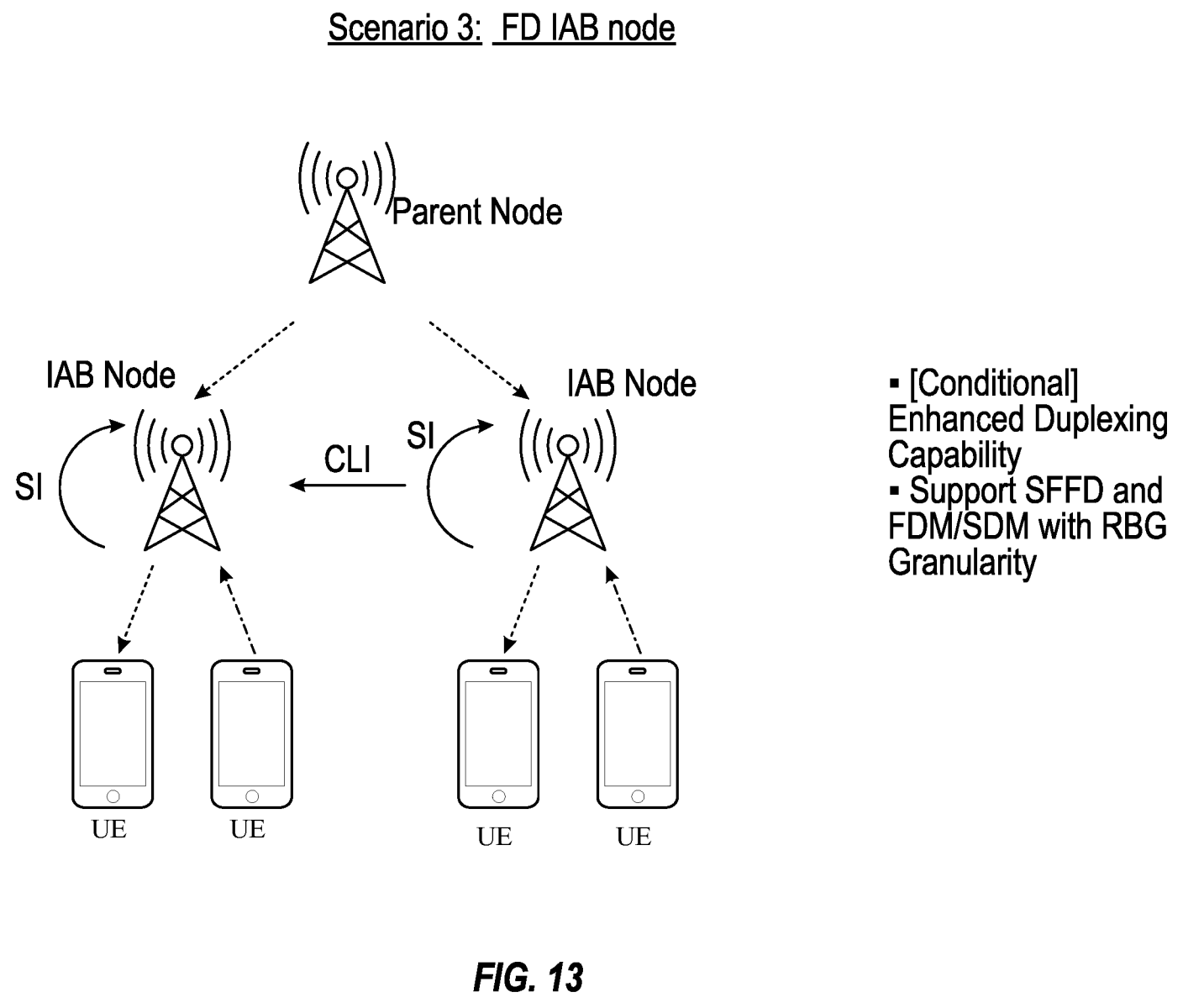

Scenario 3: FD IAB node

- [Conditional] Enhanced Duplexing Capability
- Support SFFD and FDM/SDM with RBG Granularity Parent Node IAB Node IAB Node

CLI

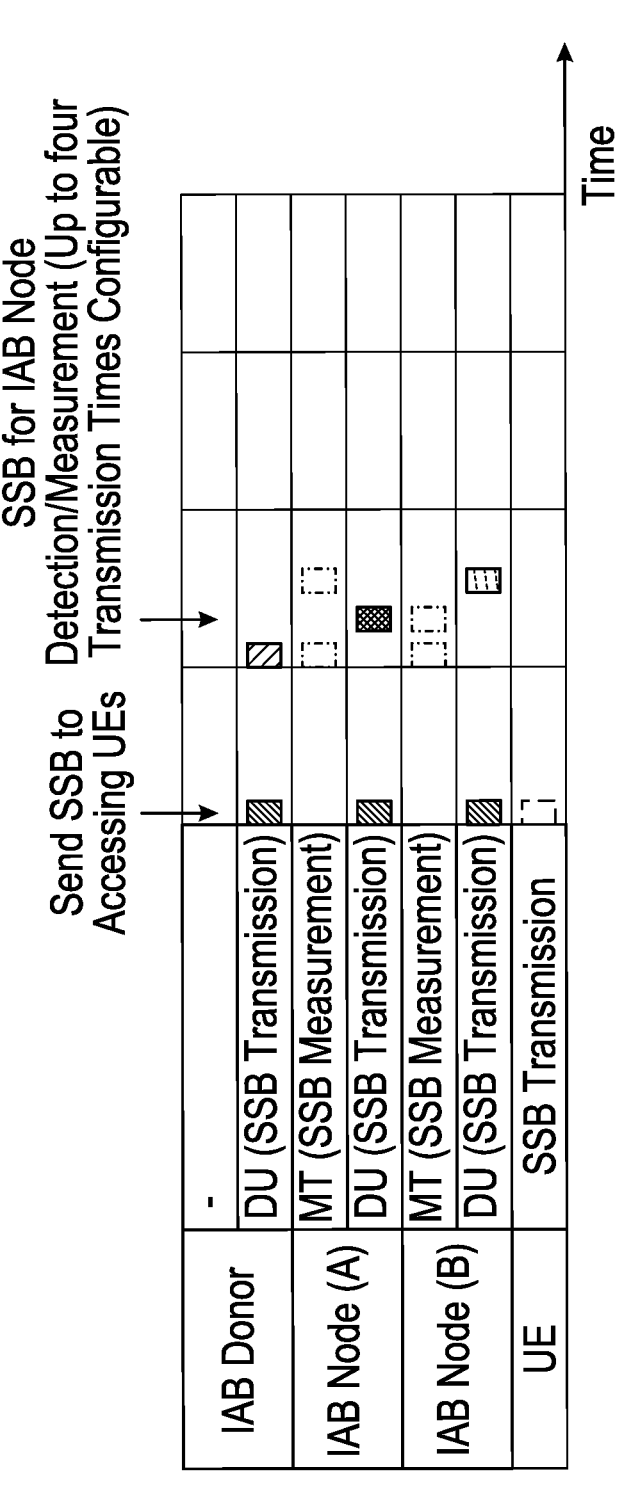

SSB for IAB Node Detection/Measurement (Up to four Transmission Times Configurable)

Send SSB to Accessing UEs

Time

| IAB Donor | - |
| IAB Node (A) | DU (SSB Transmission) |
| | MT (SSB Measurement) |
| | DU (SSB Transmission) |
| IAB Node (B) | MT (SSB Measurement) |
| | DU (SSB Transmission) |
| UE | SSB Transmission |

STC
- SSB Center Frequency
- SSB Subcarrier Spacing
- SSB Transmission Periodicity
- SSB Transmission Timing Offset in Half Frame(s)
- The Index of SSBs to Transmit
- Physical Cell ID SMTC
- SMTC Window Periodicity
- SMTC Window Timing Offset
- SMTC Window Duration
- List of Physical Cell IDs to be Measured
- SSB to be Measured

A method for wireless communications by a first network entity

Obtain a synchronization signal block (SSB) transmission configuration (STC) of a second network entity ⌐1902

Measure one or more SSBs transmitted from the second network entity in accordance with the STC configuration ⌐1904

METHOD FOR MOBILE NODE TO OBTAIN NEIGHBOR NODE SYNCHRONIZATION SIGNAL BLOCK (SSB) TRANSMISSION CONFIGURATION (STC)

BACKGROUND

Field of the Disclosure

Aspects of the present disclosure relate to wireless communications, and more particularly, to techniques for obtaining a synchronization signal block (SSB) transmission configuration (STC) of a node.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a first network entity, comprising: obtaining a synchronization signal block (SSB) transmission configuration (STC) of a second network entity; and measuring one or more SSBs transmitted from the second network entity in accordance with the STC configuration.

Another aspect provides a method for wireless communications by a node, comprising: receiving signaling from a first network entity carrying a request for a synchronization signal block (SSB) transmission configuration (STC) of a second network entity; and transmitting signaling carrying the STC configuration of the second network entity to the first network entity, in response to the request.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 6-9 depict different use cases for full-duplex (FD) communications.

FIGS. 10-13 depict different deployment scenarios for FD and half-duplex (HD) communications.

FIG. 14B depicts example synchronization signal block (SSB) transmission configuration (STC) and SSB measurement time configuration (SMTC) configured for the static IAB donor nodes, the static IAB nodes, and the UEs.

DETAILED DESCRIPTION

Figure 1:
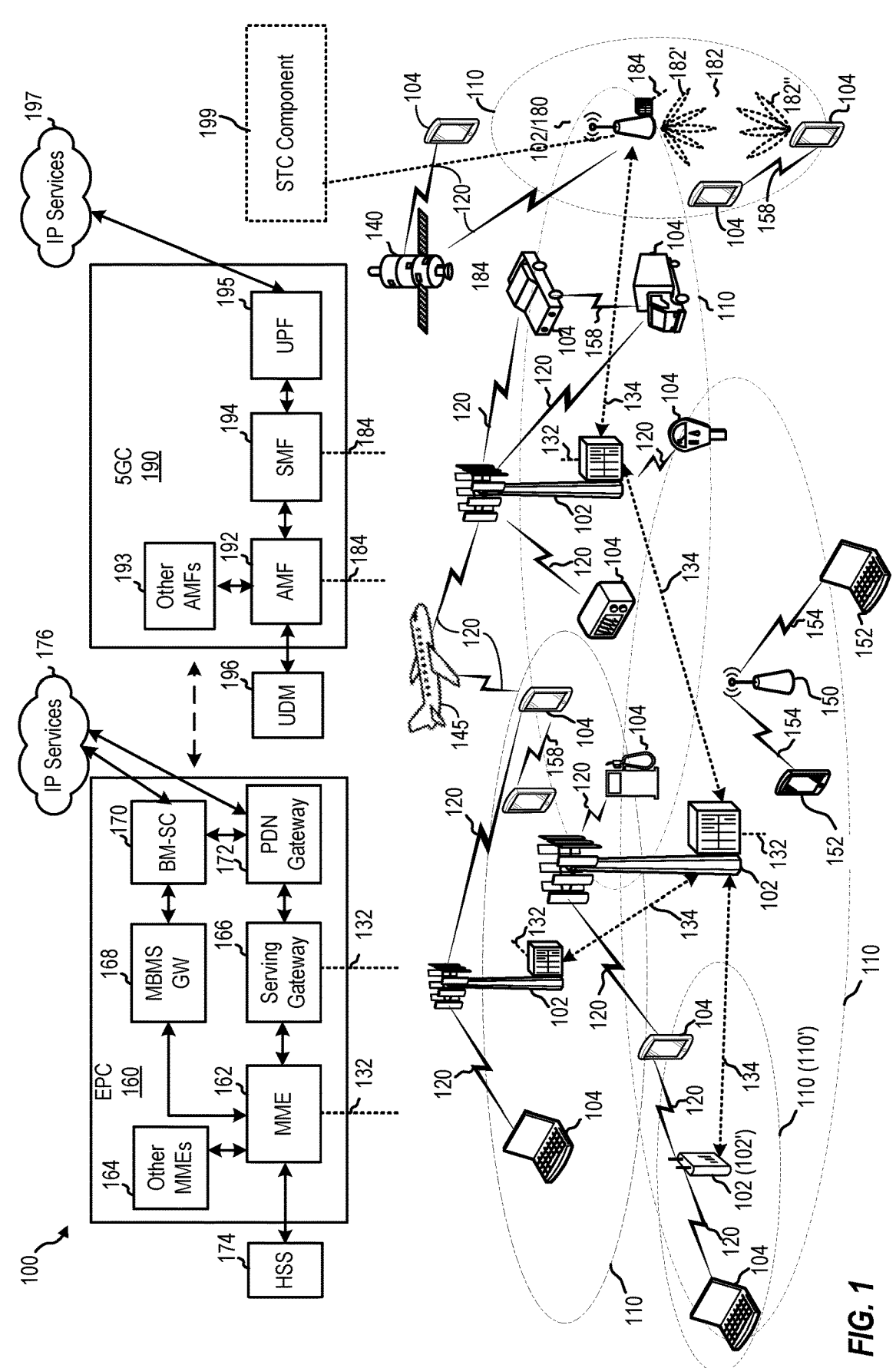
FIG. 1 depicts an example wireless communications network.

Aspects of the present disclosure provide apparatuses, methods, processing systems, and computer-readable mediums for obtaining a synchronization signal block (SSB) transmission configuration (STC) of a node in a full-duplex (FD) operation.

FD communication allows for simultaneous transmission between nodes (e.g., an integrated access and backhaul (IAB) node, gNodeB (gNB)). Half-duplex (HD) communication flows in one direction at a time.

An IAB generally refers to a node that supports a multi-hop network or a multi-hop wireless backhaul, and allows deployment of network entities with or without fiber backhaul transport. The IAB works by having a fraction of the deployed network entities act as donor nodes, using a fiber/wired connection. The remainder network entities (e.g., without a wired connection) are called IAB nodes.

In a typical IAB network, an IAB donor includes a central unit (CU) that configures a distributed unit (DU) of the IAB donor and/or the IAB nodes (e.g., a mobile termination component (MT) or a DU of the IAB nodes). For example, the CU may configure an IAB-DU and/or IAB-MT with STC and SSB measurement time configuration (SMTC) information, to facilitate transmission and measurement of SSBs (e.g., for inter-node discovery and interference management).

In typical IAB networks, inter-node discovery and interference management is limited to static IAB nodes (and not mobile IAB nodes). For example, when a mobile IAB node is present within the IAB network, there is a need for an enhanced inter-node interference measurement for at least one of: from a static IAB node to the mobile IAB node or from one mobile IAB node to another mobile IAB node. To take appropriate measures for the interference management and discover other nearby nodes (e.g., static or mobile nodes), the mobile IAB node may need to know STC configurations of neighbor nodes.

As noted above, the CU typically sends the STC configurations of the neighbor nodes to the mobile IAB node, and also configure SMTC windows for the mobile IAB node to measure SSBs of the neighbor nodes. However, since the mobile IAB node is moving around, the nodes that are nearby to the mobile IAB node are changing and unknown. As a result, the CU may not be able to generate and send a full list of the nodes nearby to the mobile IAB node and/or directly configure the SMTC windows for the mobile IAB node due to the unknown neighbor nodes.

Aspects of the present disclosure, however, provide techniques that may enable a mobile IAB node to obtain an STC configuration of a neighbor node and also its own SMTC configuration. As a result, the mobile IAB can measure inter-node interference during an STC window of the neighbor node. The mobile IAB node may obtain the STC configuration of the neighbor node via different options. The techniques proposed herein may result in a coordinated scheduling between different mobile and static nodes (once the mobile and static nodes discover each other), which will result in a reduced inter-node interference.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio BS, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
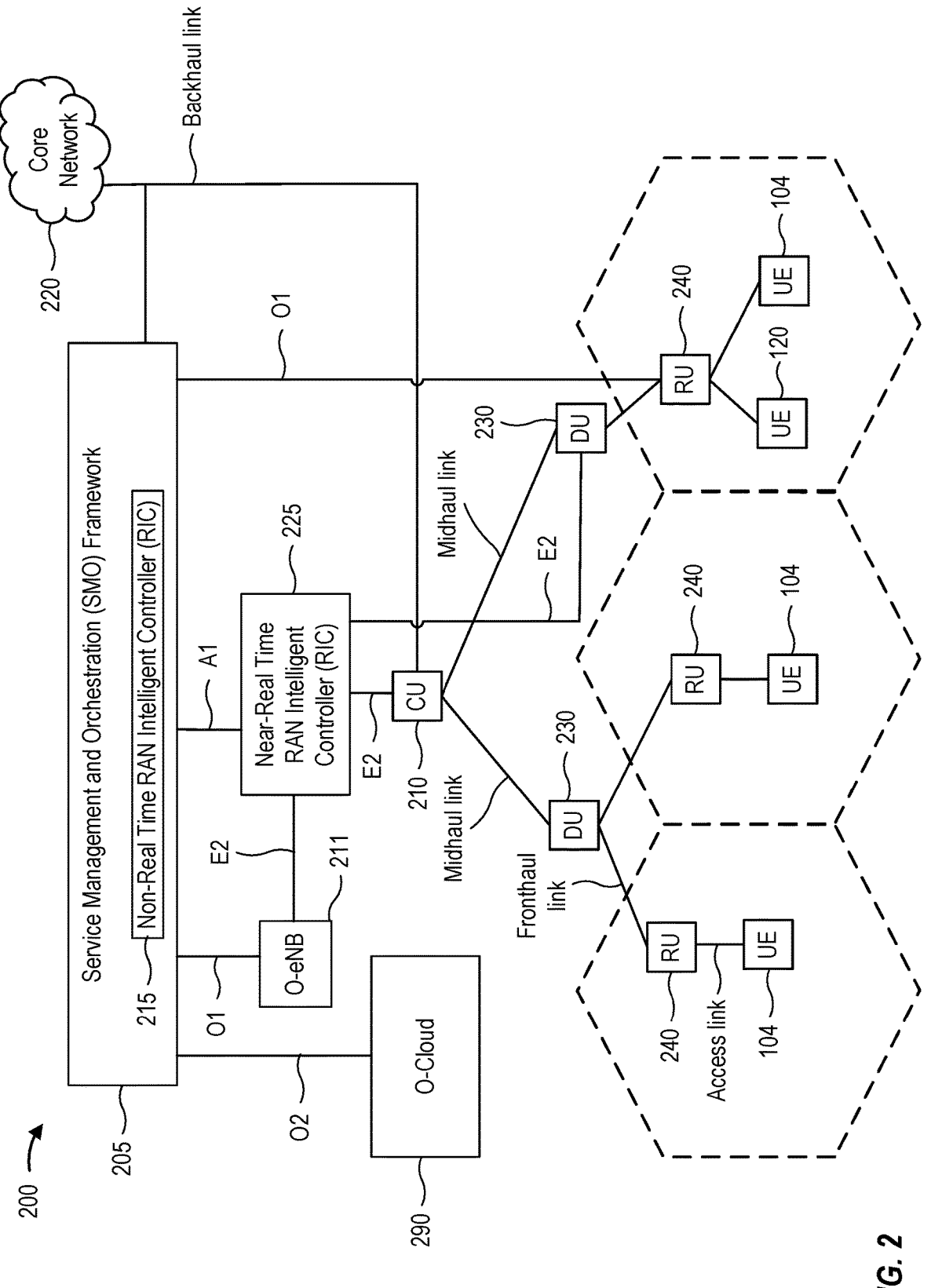
FIG. 2 depicts an example disaggregated base station (BS) architecture.

While BSs 102 are depicted in various aspects as unitary communications devices, BSs 102 may be implemented in various configurations. For example, one or more components of a BS 102 may be disaggregated, including a central unit (CU), one or more distributed units (DUs), one or more radio units (RUs), a Near-Real Time (Near-RT) RAN Intelligent Controller (MC), or a Non-Real Time (Non-RT) RIC, to name a few examples. In another example, various aspects of a BS 102 may be virtualized. More generally, a BS (e.g., BS 102) may include components that are located at a single physical location or components located at various physical locations. In examples in which a BS 102 includes components that are located at various physical locations, the various components may each perform functions such that, collectively, the various components achieve functionality that is similar to a BS 102 that is located at a single physical location. In some aspects, a BS 102 including components that are located at various physical locations may be referred to as a disaggregated radio access network (RAN) architecture, such as an Open RAN (O-RAN) or Virtualized RAN (VRAN) architecture. FIG. 2 depicts and describes an example disaggregated BS architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A BS configured to communicate using mmWave/near mmWave radio frequency bands (e.g., a mmWave BS such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs)

152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

Figure 19:
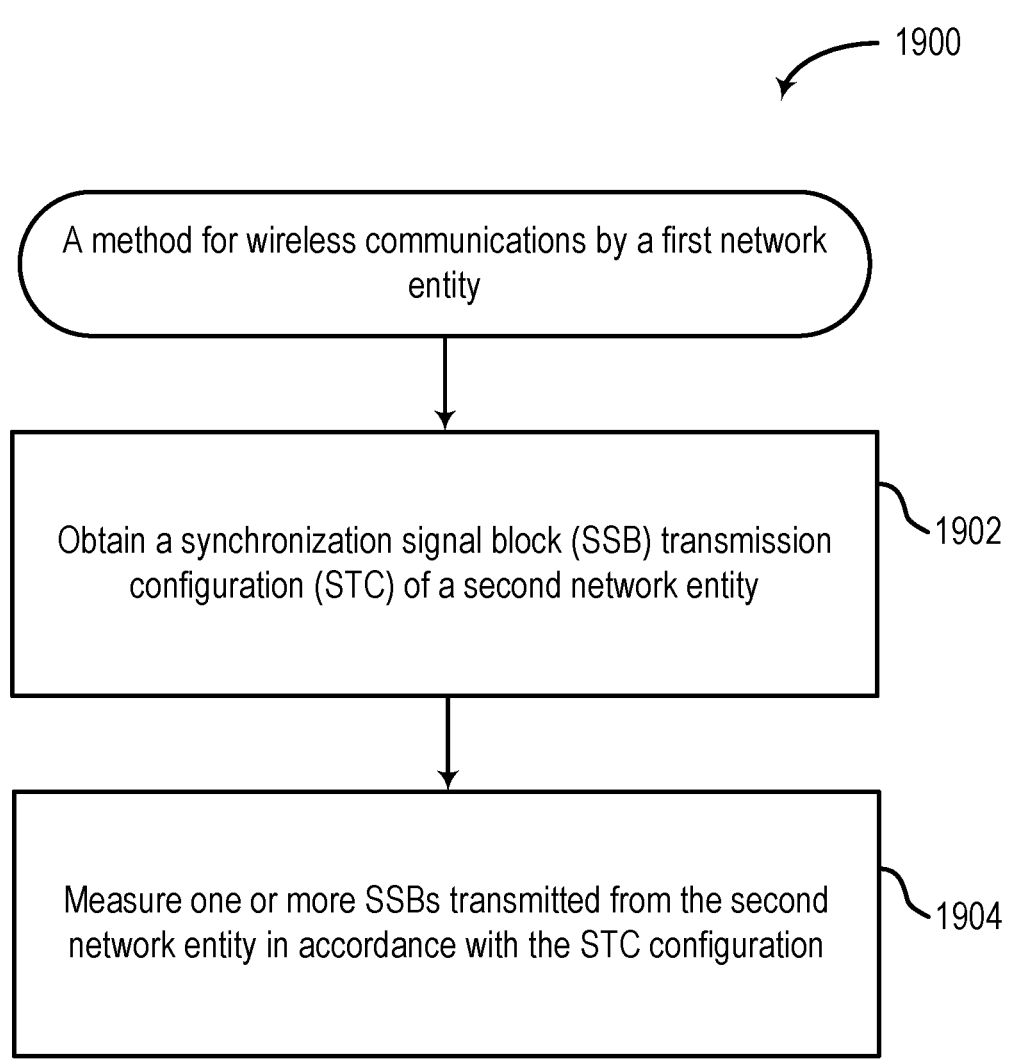
FIG. 19 depicts a method for wireless communications by a first network entity.
Figure 20:
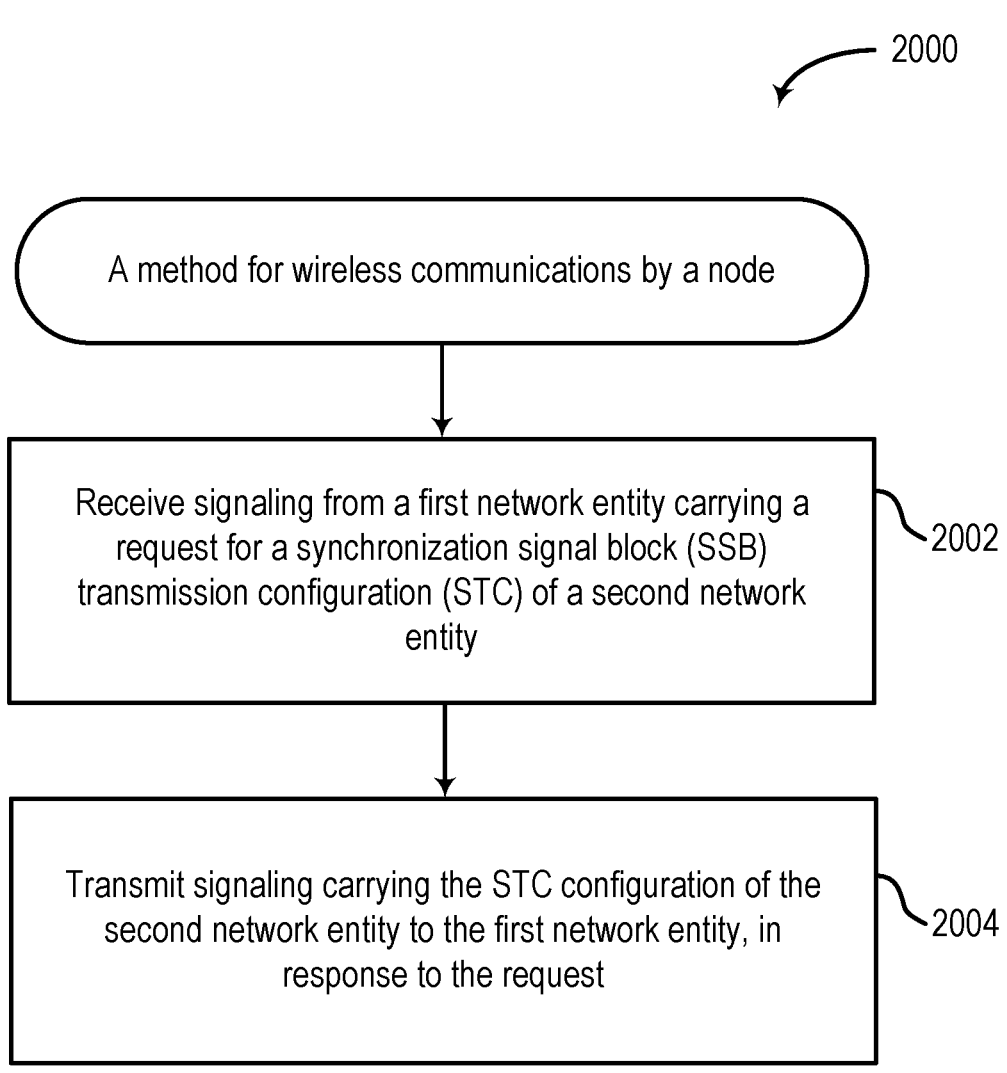
FIG. 20 depicts a method for wireless communications by a node.

Wireless communication network 100 further includes synchronization signal block (SSB) transmission configuration (STC) component 199, which may be configured to perform operations 1900 of FIG. 19 and/or operations 2000 of FIG. 20.

In various aspects, a network entity or network node can be implemented as an aggregated BS, as a disaggregated BS, a component of a BS, an integrated access and backhaul (IAB) node, a relay node, a sidelink node, to name a few examples.

FIG. 2 depicts an example disaggregated BS 200 archi-tecture. The disaggregated BS 200 architecture may include one or more central units (CUs) 210 that can communicate directly with a core network 220 via a backhaul link, or indirectly with the core network 220 through one or more disaggregated BS units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collec-tively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless trans-mission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirec-tionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more BS functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access chan-nel (PRACH) extraction and filtering, or the like), or both, based at least in part on the functional split, such as a lower layer functional split. In such an architecture, the RU(s) 240 can be implemented to handle over the air (OTA) commu-nications with one or more UEs 104. In some implementa-tions, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 inter-face). For virtualized network elements, the SMO Frame-work 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Addi-tionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and opti-mization of RAN elements and resources, Artificial Intelli-gence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Frame-work 205 or the Non-RT RIC 215 from non-network data sources or from network functions. In some examples, the Non-RT MC 215 or the Near-RT MC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
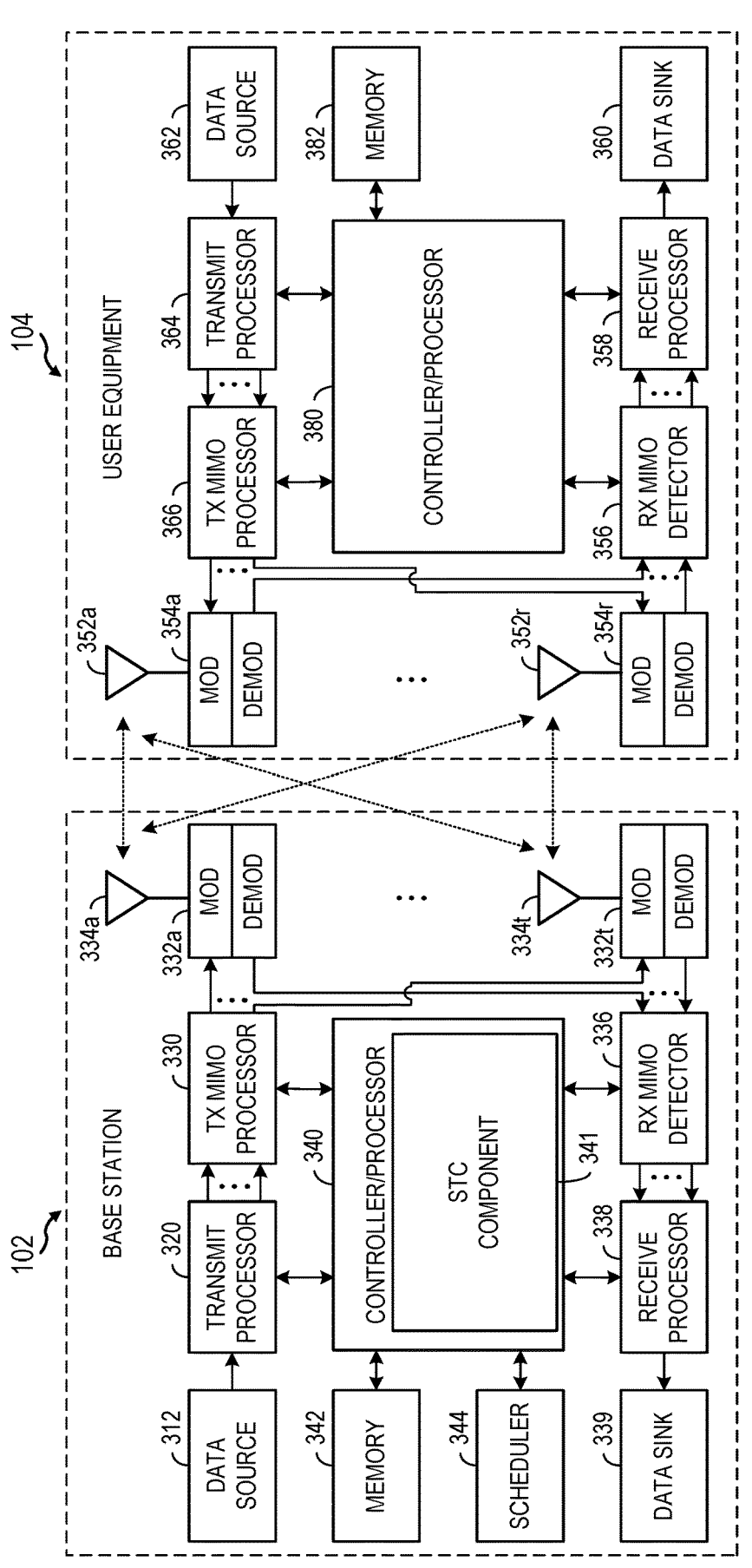
FIG. 3 depicts aspects of an example BS and an example user equipment (UE).

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

BS 102 includes controller/processor 340, which may be configured to implement various functions related to wireless communications. In the depicted example, controller/processor 340 includes STC component 341, which may be representative of STC component 199 of FIG. 1. Notably, while depicted as an aspect of controller/processor 340, STC component 341 may be implemented additionally or alternatively in various other aspects of BS 102 in other implementations.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

UE 104 includes controller/processor 380, which may be configured to implement various functions related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a-332t*. Each modulator in transceivers 332*a-332t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a-332t* may be transmitted via the antennas 334*a-334t*, respectively.

In order to receive the downlink transmission, UE 104 includes antennas 352*a-352r* that may receive the downlink signals from the BS 102 and may provide received signals to the demodulators (DEMODs) in transceivers 354*a-354r*, respectively. Each demodulator in transceivers 354*a-354r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a-354r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a-354r* (e.g., for SC-FDM), and transmitted to BS 102.

At BS 102, the uplink signals from UE 104 may be received by antennas 334*a-t*, processed by the demodulators in transceivers 332*a-332t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
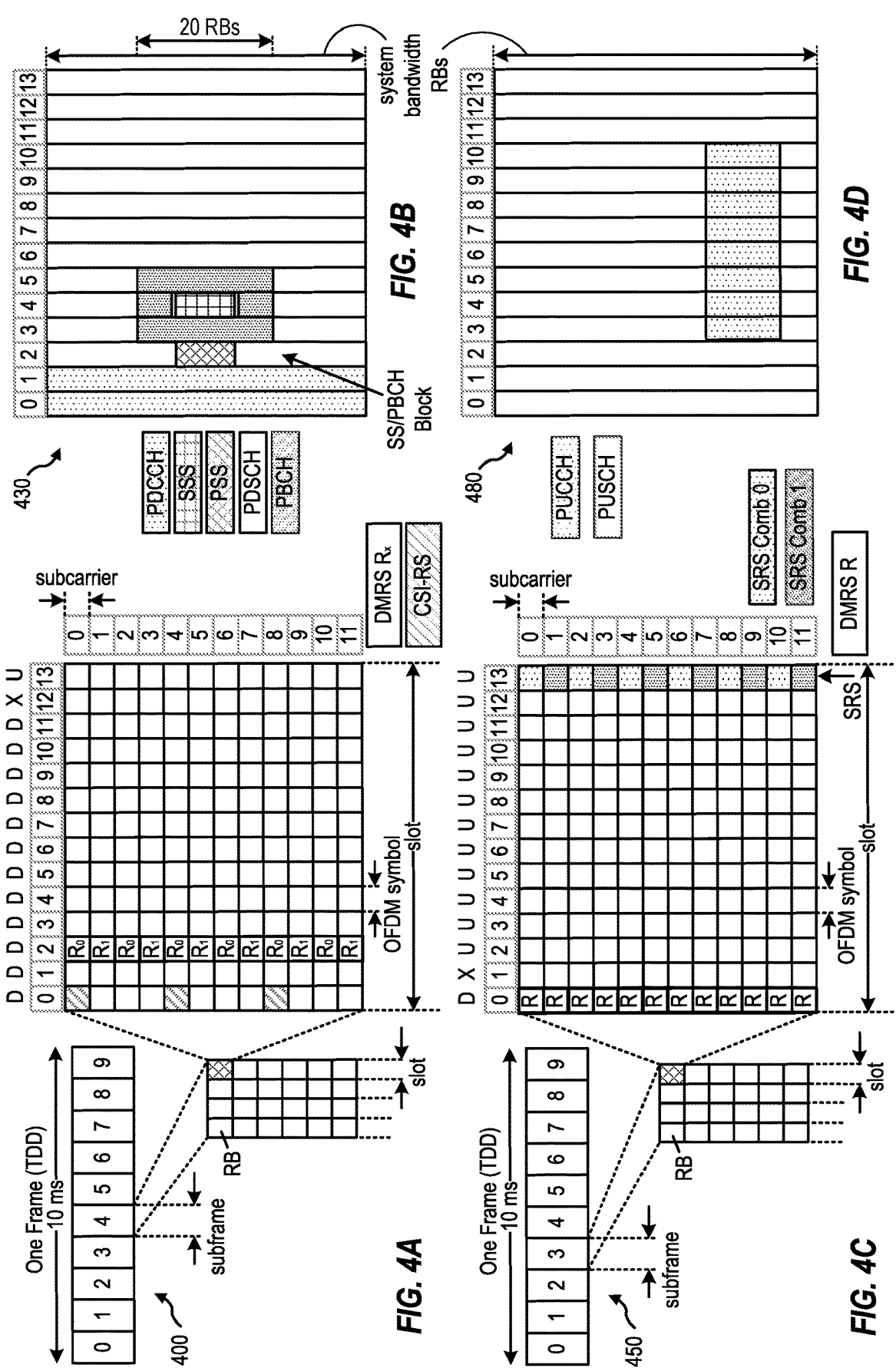
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu \times 15$ kHz, where 1.1, is the numerology $\mu$ to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the BS. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a BS for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Integrated Access and Backhaul (IAB) Network

An integrated access and backhaul (IAB) network supports a multi-hop network or a multi-hop wireless backhaul. Additionally, or alternatively, each node of the IAB network uses a same radio access technology (for example, 5G/NR).

Additionally, or alternatively, nodes of the IAB network may share resources for access links and backhaul links (such as time resources, frequency resources, and spatial resources). Furthermore, various architectures of IAB nodes or IAB donors may be supported.

In some cases, an IAB donor includes a central unit (CU) that configures the IAB nodes that access a core network via the IAB donor, and a distributed unit (DU) that schedules and communicates with child nodes of the IAB donor.

In some cases, an IAB node includes a mobile termination component (MT) that is scheduled by and communicates with a DU of a parent node, and a DU that schedules and communicates with child nodes of the IAB node. The DU of the IAB node performs functions described in connection with a network entity for that IAB node, and the MT of the IAB node performs functions described in connection with a UE for that IAB node.

Figure 5:
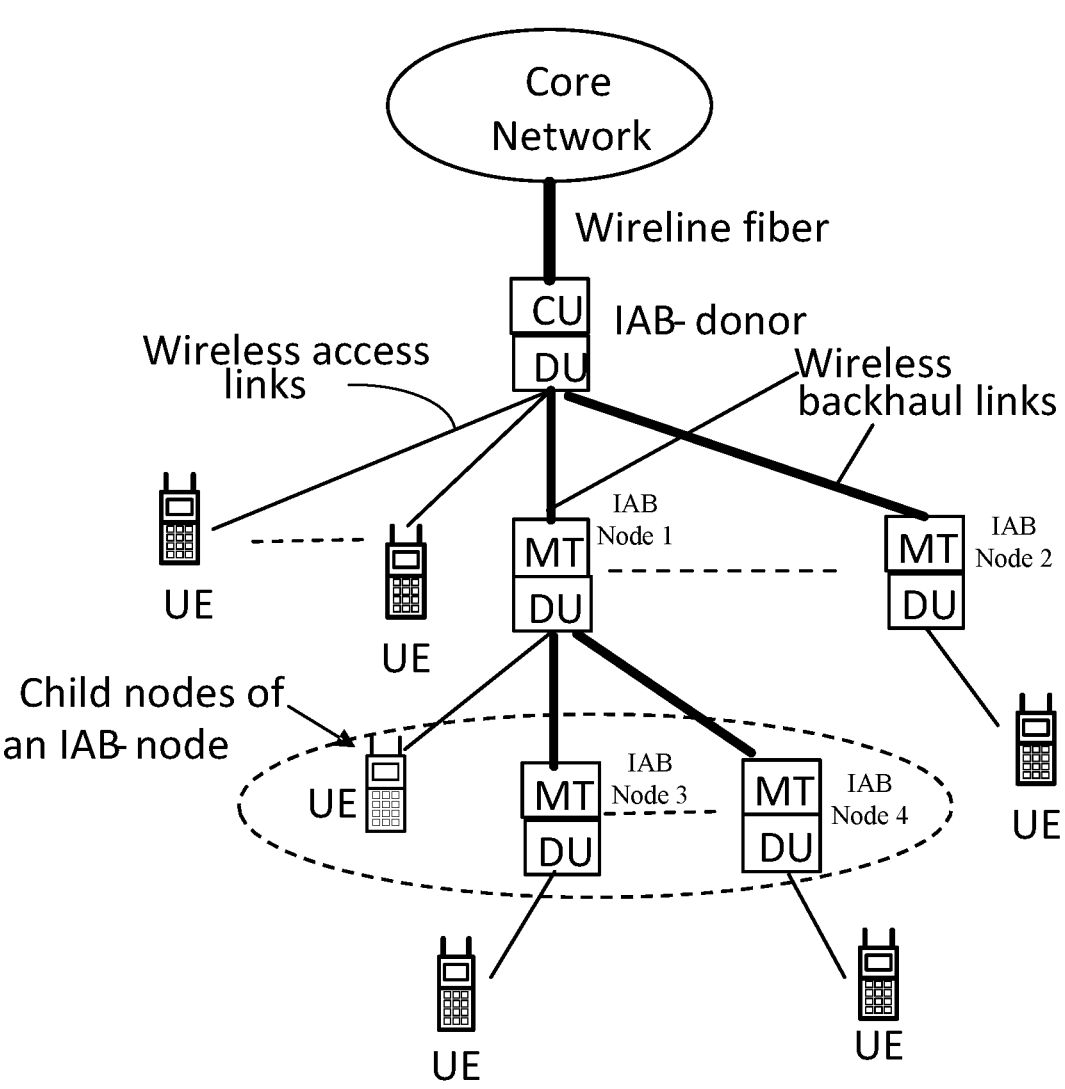
FIG. 5 depicts example integrated access and backhaul (IAB) network architecture.

FIG. 5 is a diagram illustrating an example IAB network architecture. As shown, the IAB network includes an IAB donor that connects to a core network via a wired connection (for example, as a wireline fiber). In certain aspects, an Ng interface of the IAB donor terminates at the core network. Additionally, or alternatively, the IAB donor connects to one or more devices of the core network that provide a core access and mobility management function (AMF). In some cases, the IAB donor includes a network entity, such as an anchor base station, and/or a network controller. As shown, the IAB donor includes a CU, which may perform ANC functions or AMF functions. The CU may configure a DU of the IAB donor or may configure one or more IAB nodes (e.g., an MT or a DU of an IAB node) that connect to the core network via the IAB donor. In some cases, the CU of the IAB donor may control or configure the entire IAB network that connects to the core network via the IAB donor, such as by using control messages or configuration messages (e.g., a radio resource control (RRC) configuration message, a medium access control (MAC) control element, or an F1 application protocol (F1 AP) message).

The IAB network further includes IAB nodes (e.g., IAB nodes 1 through 4) that connect to the core network via the IAB donor. As shown, an IAB node may include an MT and a DU. The MT of the IAB node (e.g., a child node) may be controlled or scheduled by another IAB node (e.g., a parent node) or by the IAB donor. The DU of the IAB node (e.g., a parent node) may control or schedule other IAB nodes (e.g., child nodes of the parent node) or UEs. Accordingly, the DU may be referred to as a scheduling node or a scheduling component, and the MT may be referred to as a scheduled node or a scheduled component. In some cases, the IAB donor includes the DU and not the MT. That is, the IAB donor may configure, control, or schedule communications of the IAB nodes or UEs. A UE includes only an MT, and not a DU. That is, communications of the UE may be controlled or scheduled by the IAB donor or the IAB node (e.g., a parent node of the UE).

In some cases, certain nodes are configured to participate in control/scheduling processes. For example, when a first node controls or schedules communications for a second node e.g., when the first node provides DU functions for the second node's MT), the first node may be referred to as a parent node of the second node, and the second node may be referred to as a child node of the first node. A child node of the second node may be referred to as a grandchild node of the first node. Accordingly, a DU of a parent node may control or schedule communications for child nodes of the parent node. A parent node may be an IAB donor or an IAB node, and a child node may be an IAB node or a UE.

Communications of an MT of a child node may be controlled or scheduled by a parent node of the child node.

As further shown in FIG. 5, a link between the UE and the IAB donor, or between the UE and the IAB node, is referred to as an access link. Each access link is a wireless access link that provides the UE with radio access to the core network via the IAB donor, and potentially via one or more IAB nodes.

As further shown in FIG. 5, a link between the IAB donor and the IAB node, or between two IAB nodes, is referred to as a backhaul link. Each backhaul link is a wireless backhaul link that provides the IAB node with radio access to the core network via the IAB donor, and potentially via one or more other intermediate IAB nodes. In some cases, the backhaul link is a primary backhaul link or a secondary backhaul link (e.g., a backup backhaul link). In some cases, the secondary backhaul link is used if the primary backhaul link fails, becomes congested, or becomes overloaded. In the IAB network, network resources for wireless communications (e.g., time resources, frequency resources, spatial resources) may be shared between access links and backhaul links.

As described above, in the IAB network, the IAB nodes (e.g., non-anchor base stations) are stationary (that is, non-moving). Conversely, in a mobile IAB network, some of the IAB nodes may have mobility (that is, may move around in the IAB network). Such IAB nodes may be referred to as mobile IAB nodes. For example, the IAB node may be installed on a vehicle (for example, a bus, a train, or a car). In the mobile IAB network, there may be a mix of stationary and mobile IAB nodes. In some cases, the mobile IAB nodes may be constrained to be "leaf" nodes in the mobile IAB network. That is, the mobile IAB node may be permitted to be only a last-hop IAB node, with only child access UEs connected to the mobile IAB node. In some cases, the mobile IAB node may be permitted to have another IAB node as a child node.

In some cases, the mobile IAB node may provide an independently moving cell site. In such a case, a moving cell site (e.g., a vehicle, such as a bus, a train, or a car) can be used for the IAB node to serve surrounding UEs (e.g., in an urban area). Here, the mobile IAB node may move relatively randomly, at relatively low speeds (e.g., urban city speed), and over a relatively large distance. In this case, the mobility of a given UE (that is not carried with the vehicle) is independent of the mobility of the IAB node (that is, the movement of the UE is not predictable based on the movement of the mobile IAB node), but may also be at relatively low speeds (a speed similar to the mobile IAB node).

In some cases, the mobile IAB node may provide a jointly moving cell site (e.g., a high-speed train). In such a case, the mobile IAB node may be mounted on the moving cell site (e.g., on top of a high-speed train) in order to serve UEs on or in the moving cell site (e.g., UEs inside the high-speed train). Here, the mobility of the mobile IAB node may be predictable, at relatively high speeds, and over a large distance. In this use case, UEs on or in the moving cell site move jointly with the mobile IAB node (that is, UE movement is predictable based on the movement of the mobile IAB node).

In some cases, the mobile IAB node may facilitate a platoon, when, for example, a loose group of UEs is generally moving together. In such a case, a single IAB node may provide network connectivity for nearby UEs. For example, the mobile IAB node mounted on a first vehicle driving on a freeway may provide network connectivity for UEs in the first vehicle as well as for UEs in other vehicles driving on the freeway in the same direction and at a similar speed. In such cases, the mobile IAB node connects to the network, while other vehicles might house respective child nodes. Here, the mobile IAB node moves with local predictability, at a relatively constant speed, and over a relatively large distance. Further, the UEs move jointly with the mobile IAB node.

A mobility state of a communication device or node (e.g., an IAB node) may be defined by a number of characteristics. Generally, mobility state can refer to a node's mobility class, movement degree, and/or movement capability. A component's mobility state may be static (e.g., not changing) or dynamic (e.g., changing with time). Mobility states may be dependent upon other factors such that it indicates a relative state with respect to other network components. Mobility states may be based on one or more characteristics as desired or according to design/operational principles. A first characteristic is a level of mobility (for example, stationary, low-speed mobility, medium-speed mobility, high-speed mobility). Mobility levels may generally reflect a point in time velocity, a range of velocities, a running average historical mobility/velocity pattern, or some other characterization of general movement abilities. A second characteristic is a change or a transition from one mobility state to another (for example, the mobility state of an IAB node may change or transition over time). For example, a mobile IAB node may transition to stationary (for example, from low-speed mobility), or may transition from one mobility class to another (for example, from medium-speed mobility to high-speed mobility). In some instances, there may be a timer associated with such a transition (for example, an IAB node may transition from one state to another within an indicated window of time). Mobility-state characteristics can generally be shared by a device or among devices for enhanced network operations (e.g., using a variety of signals/messages over various interfaces).

Example Full-Duplex (FD) Use Cases

The techniques presented herein relate to obtaining a synchronization signal block (SSB) transmission configuration (STC) of a neighbor node by a mobile node in a full-duplex (FD) and/or a half-duplex (HD) system. The FD allows for simultaneous transmission between nodes (e.g., a user equipment (UE) and/or a network entity). In the HD system, communication flows in one direction at a time.

The techniques presented herein may be applied in various bands utilized for new radio (NR). For example, for a higher band referred to as frequency range (FR)4 (e.g., 52.6 GHz-114.25 GHz), an orthogonal frequency division multiplexing (OFDM) waveform with very large subcarrier spacing (SCS; 960 kHz-3.84 MHz) is required to combat severe phase noise. Due to a large SCS, a slot length tends to be very short. In a lower band referred to as FR2 (24.25 GHz to 52.6 GHz) with 120 kHz SCS, the slot length is 125 μSec, while in FR4 with 960 kHz, the slot length is 15.6 μSec. In some cases, a frequency band referred to as FR2x may be used.

There are various motivations for utilizing FD communications, for example, for simultaneous uplink/downlink transmissions in FR2. In some cases, FD capability may enable flexible time division duplexing (TDD) capability, and may be present at either a network entity or a UE or both. For example, at the UE, uplink transmissions may be sent from one antenna panel (e.g., of multiple antenna panels) and downlink receptions may be performed at another antenna panel. In another example, at a gNodeB (gNB), the uplink transmissions may be from one panel and the downlink receptions may be performed at another panel.

The FD capability may be conditional on a beam separation (e.g., self-interference between downlink and uplink, clutter echo, etc.). The FD capability may mean that the UE or the gNB is able to use frequency division multiplexing (FDM) or spatial division multiplexing (SDM) on slots conventionally reserved for uplink only or downlink only slots (or flexible slots that may be dynamically indicated as either an uplink or a downlink).

The potential benefits of the FD communications include latency reduction (e.g., it may be possible to receive downlink signals in what would conventionally be considered uplink only slots, which can enable latency savings), coverage enhancement, spectrum efficiency enhancements (per cell and/or per UE), and/or overall more efficient resource utilization.

Figure 6:
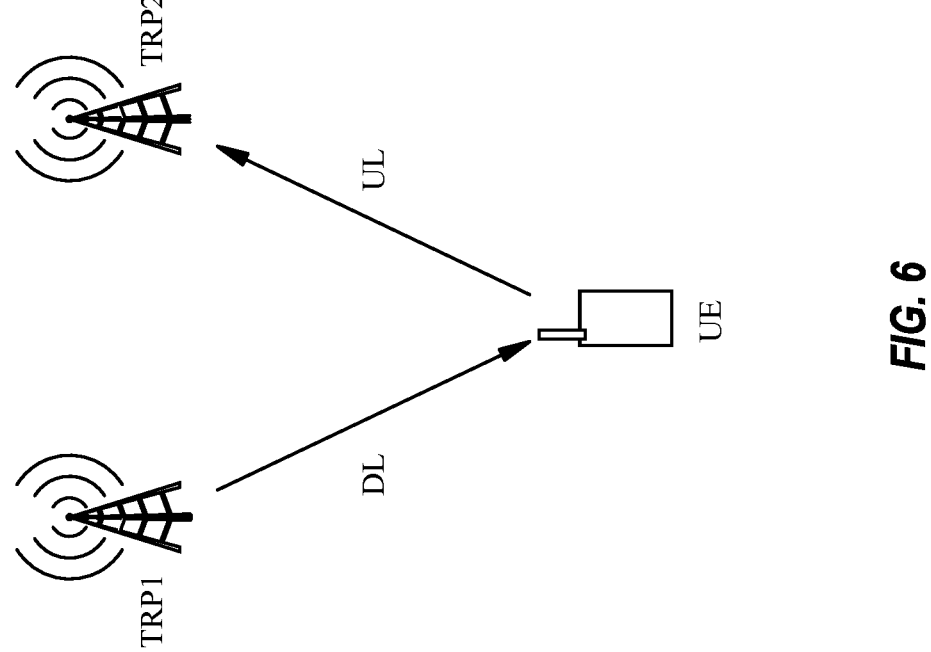
Figure 7:
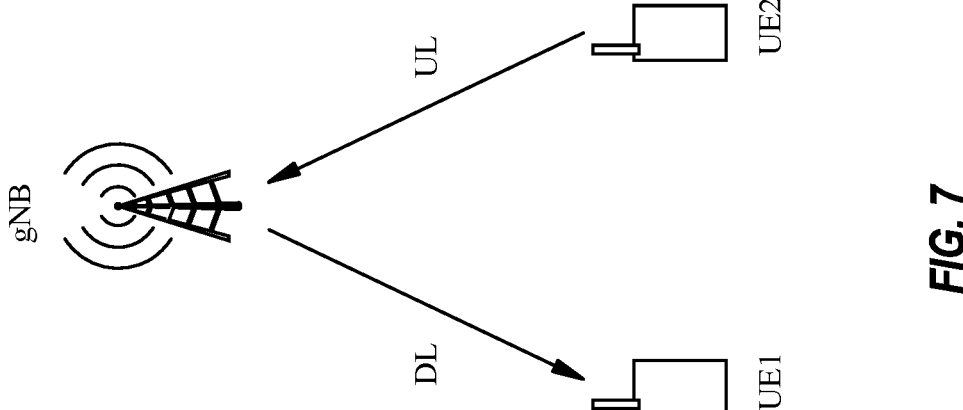
Figure 8:
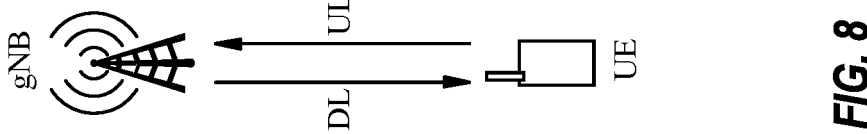

FIGS. 6-8 illustrate example use cases for FD communications. FIG. 9 summarizes certain possible features of these use cases.

As illustrated in FIG. 6, for a first use case (e.g., Use Case 1), one UE simultaneously communicates with a first transmitter receiver point (TRP 1) on a downlink, while transmitting to a second TRP on an uplink. For this use case, FD is disabled at a gNB (i.e., TRP) and enabled at the UE.

As illustrated in FIG. 7, for a second use case (e.g., Use Case 2), one gNB simultaneously communicates with a first UE (UE 1) on a downlink, while communicating with a second UE (UE 2) on an uplink. For this use case, FD is enabled at the gNB and disabled at the UE. Use cases with the FD enabled at the gNB and disabled at the UE may be suitable for integrated access and backhaul (IAB) applications as well (e.g., as illustrated in a table of FIG. 9).

As illustrated in FIG. 8, for a third use case (e.g., Use Case 3), a UE simultaneously communicates with a gNB, transmitting on an uplink while receiving on a downlink. For this use case, FD is enabled at both the gNB and the UE.

Figure 10:
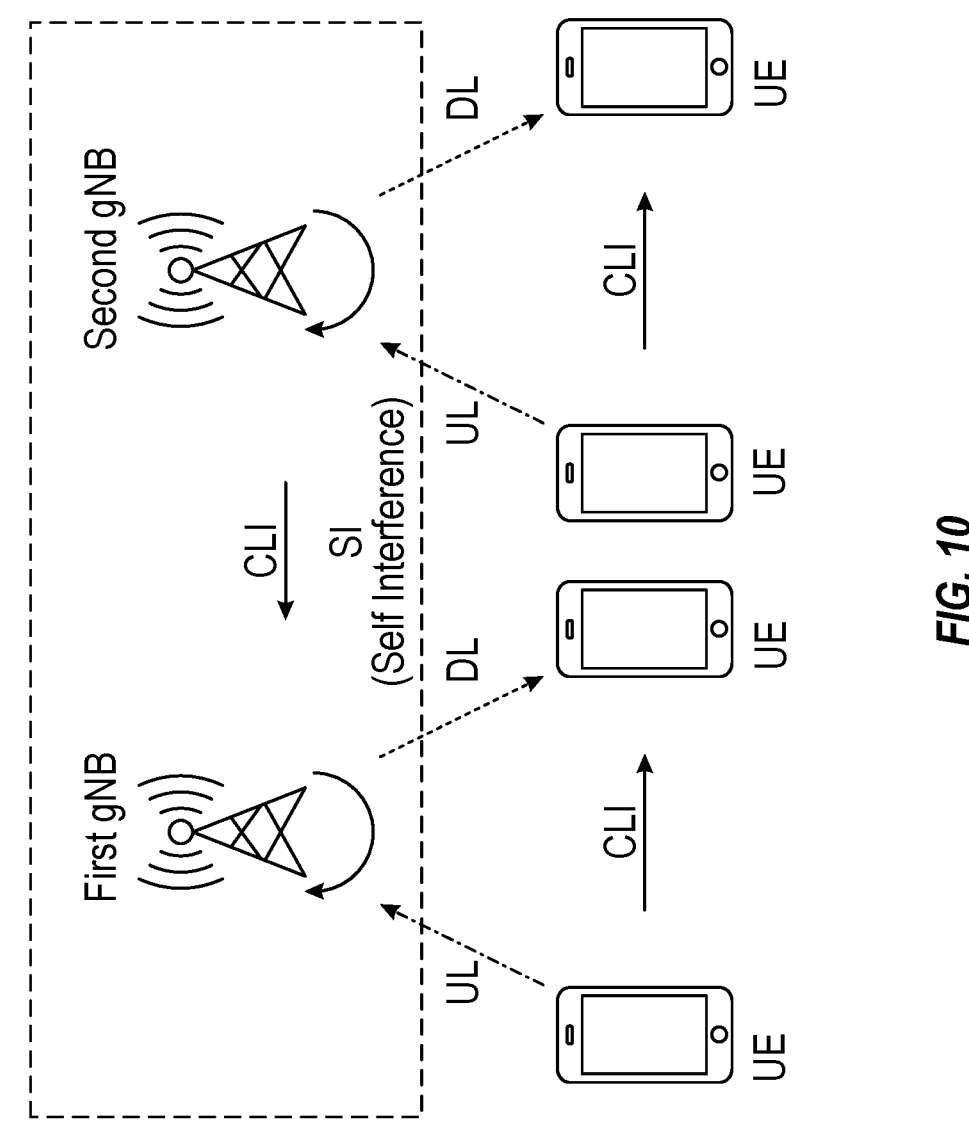

As illustrated in FIG. 10, FD is enabled at gNB and disabled at UE. For example, a first gNB simultaneously communicates with one UE on a downlink while communicating with another UE on an uplink. Similarly, a second gNB simultaneously communicates with one UE on a downlink while communicating with another UE on an uplink. In some cases, implementation of FD communications/TDD systems may introduce a few challenges. One of them is cross-link interference (CLI), which occurs when one gNB (e.g., the first gNB) is transmitting, while another gNB (e.g., the second gNB) is receiving in a same frequency band. The gNBs usually transmit at higher power and have better propagation conditions between them, i.e., lower path loss compared to the link between gNB and UE. As a result, the CLI can be significant when the gNB in uplink is interfered by the downlink from another gNB. This may then result in a decrease in throughput. In this case, there may also be CLI between the UEs when one UE is transmitting, while another UE is receiving in a same frequency band.

Figure 11:
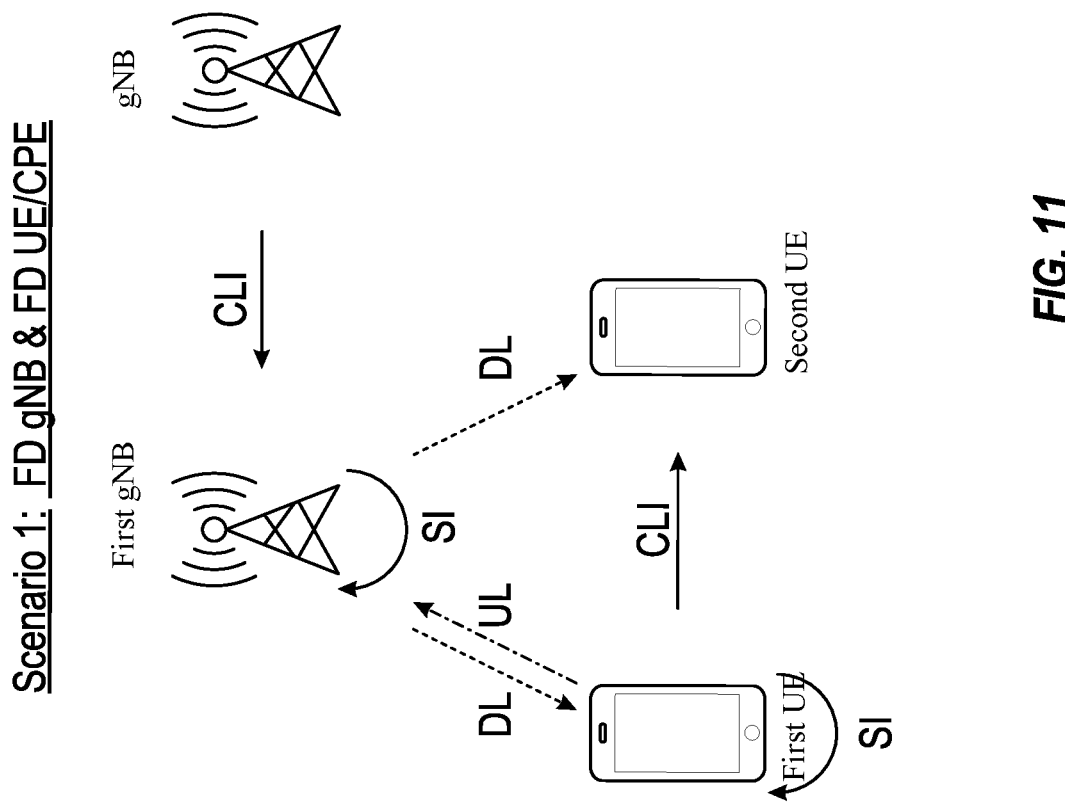

As illustrated in FIG. 11, FD is enabled at gNB and UE. For example, a first gNB simultaneously communicates with a first UE on downlink and uplink, while communicating with a second UE on a downlink. In this case, there may be CLI between the gNBs when one gNB is transmitting, while another gNB is receiving in a same frequency band. In this case, there may also be CLI between the UEs (e.g., from the first UE to the second UE) when one UE is transmitting, while another UE is receiving in a same frequency band.

Figure 12:
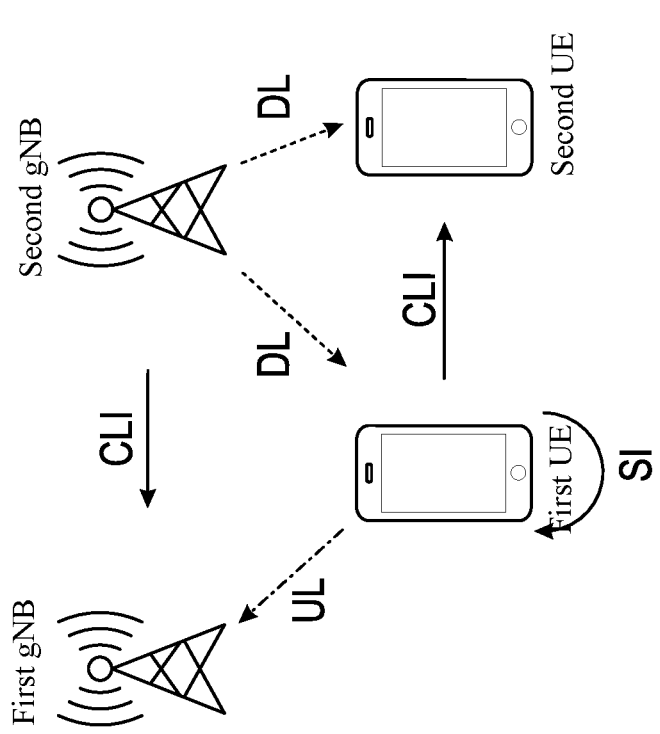

As illustrated in FIG. 12, HD is enabled at gNB and FD is enabled at UE. For example, a first gNB communicates with a first UE on an uplink, and a second gNB communicates with the first UE and a second UE on a downlink. The first UE simultaneously communicates with the first gNB on an uplink while communicating with the second gNB on a downlink. In this case, there may be CLI between the gNBs (e.g., from the second gNB to the first gNB) when one gNB is transmitting, while another gNB is receiving in a same frequency band. In this case, there may also be CLI between the UEs (e.g., from the first UE to the second UE) when one UE is transmitting, while another UE is receiving in a same frequency band.

As illustrated in FIG. 13, a parent node (e.g., an IAB donor node) is associated with two child nodes (e.g., IAB nodes). The IAB node may be a network entity. Both the IAB nodes are FD enabled. For example, each IAB node simultaneously communicates with one UE on a downlink while communicating with another UE on an uplink. In this case, there may be CLI between the IAB nodes when one IAB node is transmitting, while another IAB node is receiving in a same frequency band.

Example Static Integrated Access and Backhaul (IAB) Nodes

Figure 14A:
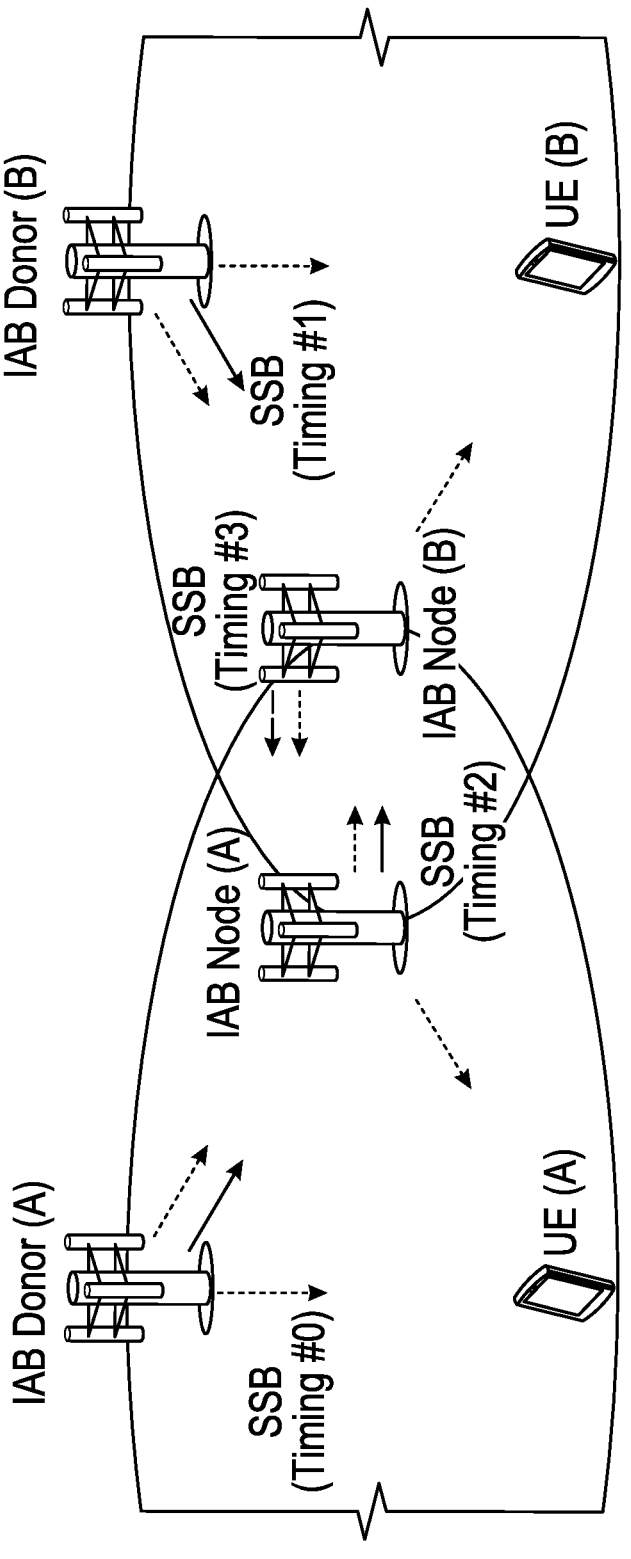
FIG. 14A depicts example communication between static IAB donor nodes, static IAB nodes, and UEs.

FIG. 14A depicts example communication between integrated access and backhaul (IAB) donor nodes, IAB nodes, and user equipments (UEs). The IAB donor nodes may be static nodes, and include IAB donor A and IAB donor B. The IAB nodes may be static nodes, and include IAB node A and IAB node B. The UEs include UE A and UE B.

The IAB donor (e.g., IAB donor A, IAB donor B) includes a central unit (CU) that configures a distributed unit (DU) of the IAB donor and/or the IAB nodes (e.g., a mobile termination component (MT) or a DU of the IAB node) that connect to a core network via the IAB donor. For example, as illustrated in FIG. 14B, the CU of the IAB donor may configure synchronization signal block (SSB) transmission configuration (STC) and SSB measurement time configuration (SMTC) in time division multiplex (TDM) at IAB-DU and/or IAB-MT, respectively, for half-duplex (HD) constraint to facilitate transmission and measurement of SSBs (e.g., for inter-node discovery and interference management).

As further illustrated in FIG. 14B, the STC configuration may include various parameters such as SSB center frequency, SSB subcarrier spacing, SSB transmission periodicity (e.g., periodicity of the transmission of the one or more SSBs), SSB transmission timing offset (e.g., starting point of one SSB transmission periodicity in terms of slot), index of SSBs to transmit (e.g., at least one index associated with the one or more SSBs to be transmitted), or any combination thereof. In some cases, multiple STCs may be configured for the IAB node. The STC configuration may be specific to a cell or frequency location per DU.

As further illustrated in FIG. 14B, the SMTC configuration may include various parameters such as SSB center frequency (e.g., a center frequency associated with the transmission of the one or more SSBs), SSB subcarrier spacing (e.g., an SSB subcarrier spacing associated with the transmission of the one or more SSBs), SMTC window periodicity (e.g., the measurement occurring every period T corresponding to the SMTC window periodicity), SMTC window timing offset (e.g., timing offset from a reference point in time), SMTC window duration (e.g., duration of the window during which the measurement is performed), list of one or more physical cell IDs to be measured, list of the one or more SSBs to be measured, or any combination thereof.

In some cases, the CU of the IAB donor may configure STC configurations at the IAB-DU and/or the IAB-donor-DU (e.g., both are static nodes) for neighbor IAB-MT to measure SSBs from the IAB-DU and/or IAB-donor-DU. A maximum number of the STC configurations configured for the IAB-DU and/or the IAB-donor-DU is five. In one example, the five STC configurations may include one STC configuration for an access link and four STC configurations for a backhaul link. The STC information (e.g., the STC configurations) is sent by the CU of the IAB donor to the IAB-DU and/or the IAB-donor-DU via F1 interface (e.g., IAB Info IAB-donor-CU→IAB STC Info). The used STC information can also be sent by the IAB-DU and/or the IAB-donor-DU to the CU of the IAB donor (e.g., F1 Setup Request→Served Cell Information→IAB Info IAB-DU→IAB STC Info).

The above-noted inter-node discovery and interference management based on the STC configuration and the SMTC configuration is for static IAB nodes (and not mobile IAB nodes). For example, when a mobile IAB node (or gNodeB (gNB)) is present within an IAB network, there is a need for an enhanced inter-gNB interference measurement for at least one of: from a static IAB node/gNB to the mobile IAB node or from the mobile IAB node to the mobile IAB node. To take appropriate measures for the interference management and discover other nearby nodes (e.g., static or mobile nodes), the mobile IAB node needs STC configurations of neighbor gNBs (e.g., static or mobile gNBs).

Typically, the CU of the IAB donor may send a list of STC configurations of neighbor gNBs to the mobile IAB node. The CU of the IAB donor may also initially configure SMTC windows for the mobile IAB node to measure SSBs of the neighbor gNBs. However, when the mobile IAB node moves away from the neighbor gNBs, the mobile IAB node may not be able to find the SSBs of any current neighbor gNBs as the neighbor gNBs may change. In such situations, the mobile IAB node may disturb/stop its own access link SSB transmissions during its own access link STC windows. The mobile IAB node may then switch to use its MT functionality to listen to other neighbor gNBs access link SSBs to search for any new candidate neighbor gNBs. The mobile IAB node may find a new neighbor gNB using its MT functionality. After finding the new neighbor gNB using its MT functionality, the mobile IAB node may need to obtain STC configuration of the new neighbor gNB (e.g., via different options noted below). After obtaining the STC configuration of the new neighbor gNB, the mobile IAB node may self configure and update its new SMTC windows to listen/measure STC windows of the new neighbor gNB, and report to the CU of the IAB donor node about the new neighbor gNB. Based on the report, the CU of the IAB donor node may reconfigure the STC and SMTC configurations of the mobile IAB node to transmit and receive from the new neighbor gNB. The mobile IAB node may then switch back to its DU functionality and start to again transmit the SSBs for the access link. Accordingly, obtaining the STC configuration of the new neighbor gNB may help the mobile IAB node self-recovery and reconnection with the new neighbor gNB.

As noted above, although the CU of the IAB donor sends the list of STC configurations of the neighbor gNBs to the mobile IAB node, however, since the mobile IAB node is moving around, the gNBs that are nearby to the mobile IAB node are changing and unknown. As a result, the CU of the IAB donor can not generate and send a full list of nearby gNBs to the mobile IAB node (e.g., also due to a large overhead) and/or directly configure the SMTC windows for the mobile IAB node due to unknown neighbor gNBs of the mobile IAB node. Accordingly, there is a need for techniques for the mobile IAB node to obtain the STC configuration of the neighbor gNB and also its own SMTC configuration, so that the mobile IAB can measure inter-gNB interference during STC windows of its neighbor gNB.

Aspects Related to Techniques for Mobile IAB/gNB to Obtain Neighbor STC Configuration Aspects of the present disclosure provide apparatuses, methods, processing systems, and computer-readable mediums for obtaining a synchronization signal block (SSB) transmission configuration (STC) of a network entity.

For example, techniques proposed herein support a mobile network entity to obtain an STC configuration of a neighbor network entity, so that the mobile network entity can measure inter-network entity interference during an STC window of the neighbor network entity. The mobile network entity may obtain the STC configuration of the neighbor network entity via one or more options. In one option, the neighbor network entity may broadcast its own STC configuration to the mobile network entity. In another option, the mobile network entity may send a request to the neighbor network entity for the STC configuration of the neighbor network entity.

The techniques proposed may result in a coordinated scheduling between different mobile and static network entities (once the mobile and static network entities discover each other), which will result in a reduced inter-network entity interference. The techniques proposed herein may be understood with reference to the FIGS. 15-20.

Figure 15:
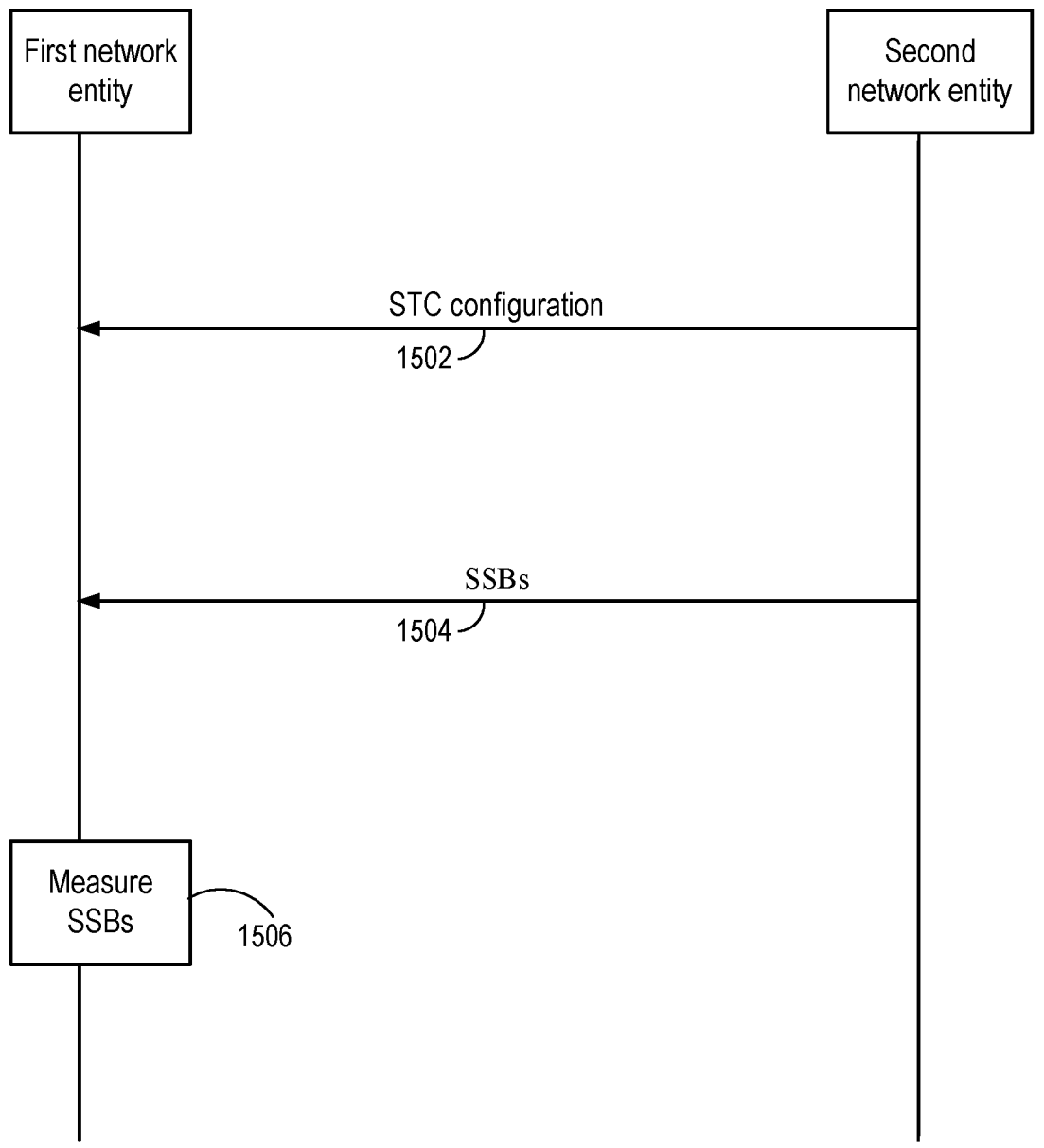
FIGS. 15-17 depict example call flow diagrams illustrating communication between different network entities and nodes.

As illustrated in FIG. 15, at 1502, a first network entity (e.g., such as gNodeB (gNB) or BS 102 in wireless communication network 100 of FIG. 1) receives an STC configuration of a second network entity from the second network entity. For example, the first network entity may receive broadcast signaling (e.g., remaining minimum system information (RMSI)) from the second network entity carrying the STC configuration of the second network entity.

Figure 18:
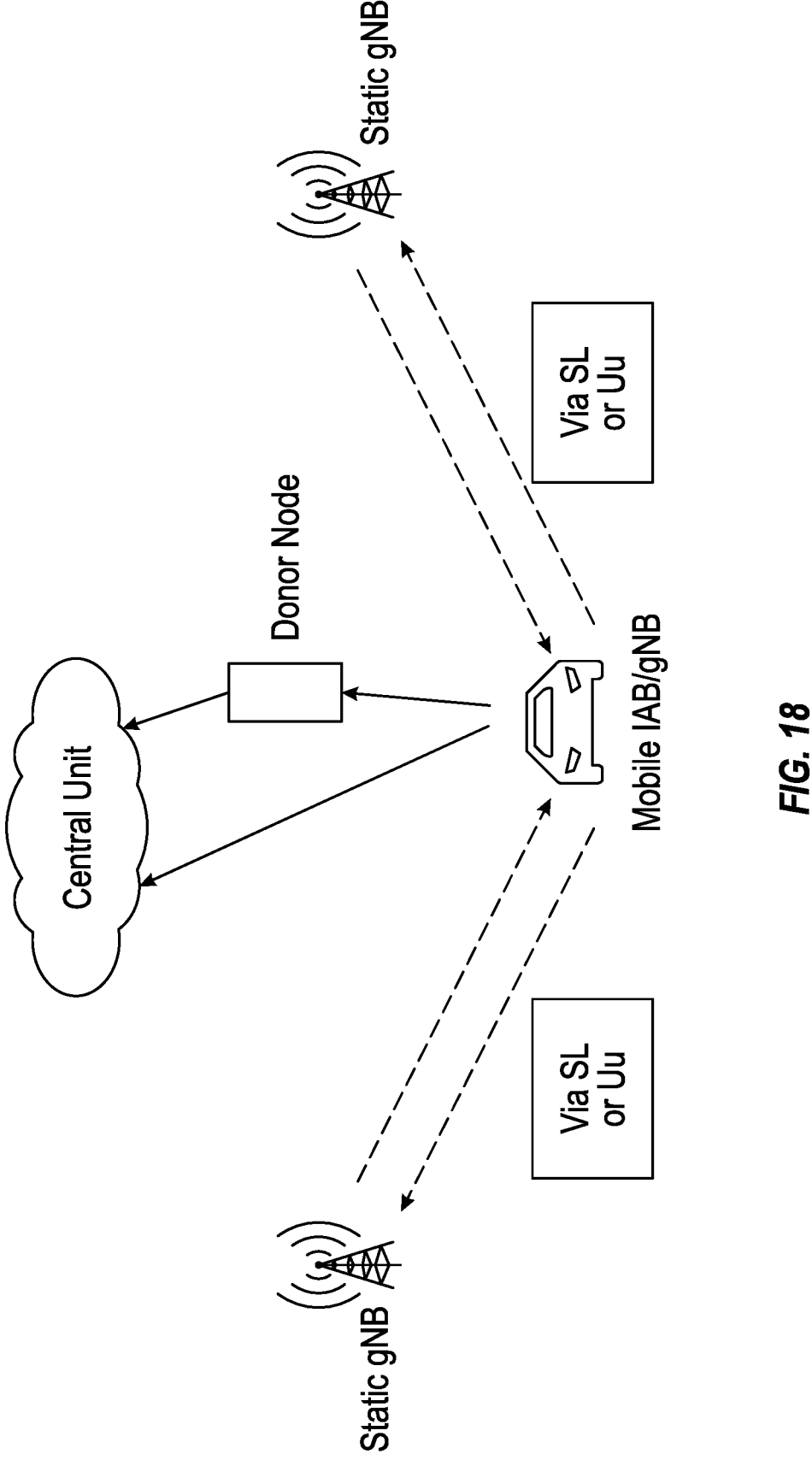
FIG. 18 depicts example communication between static and mobile nodes.

In one example, the first network entity is a mobile integrated access and backhaul (IAB) node (e.g., as illustrated in FIG. 18). In another example, the first network entity is a static IAB node. In one example, the second network entity is a mobile IAB node. In another example, the second network entity is a static IAB node.

At 1504, the second network entity transmits one or more SSBs to the first network entity.

At 1506, the first network entity measures the one or more SSBs from the second network entity, in accordance with the received STC configuration of the second network entity.

Figure 16:
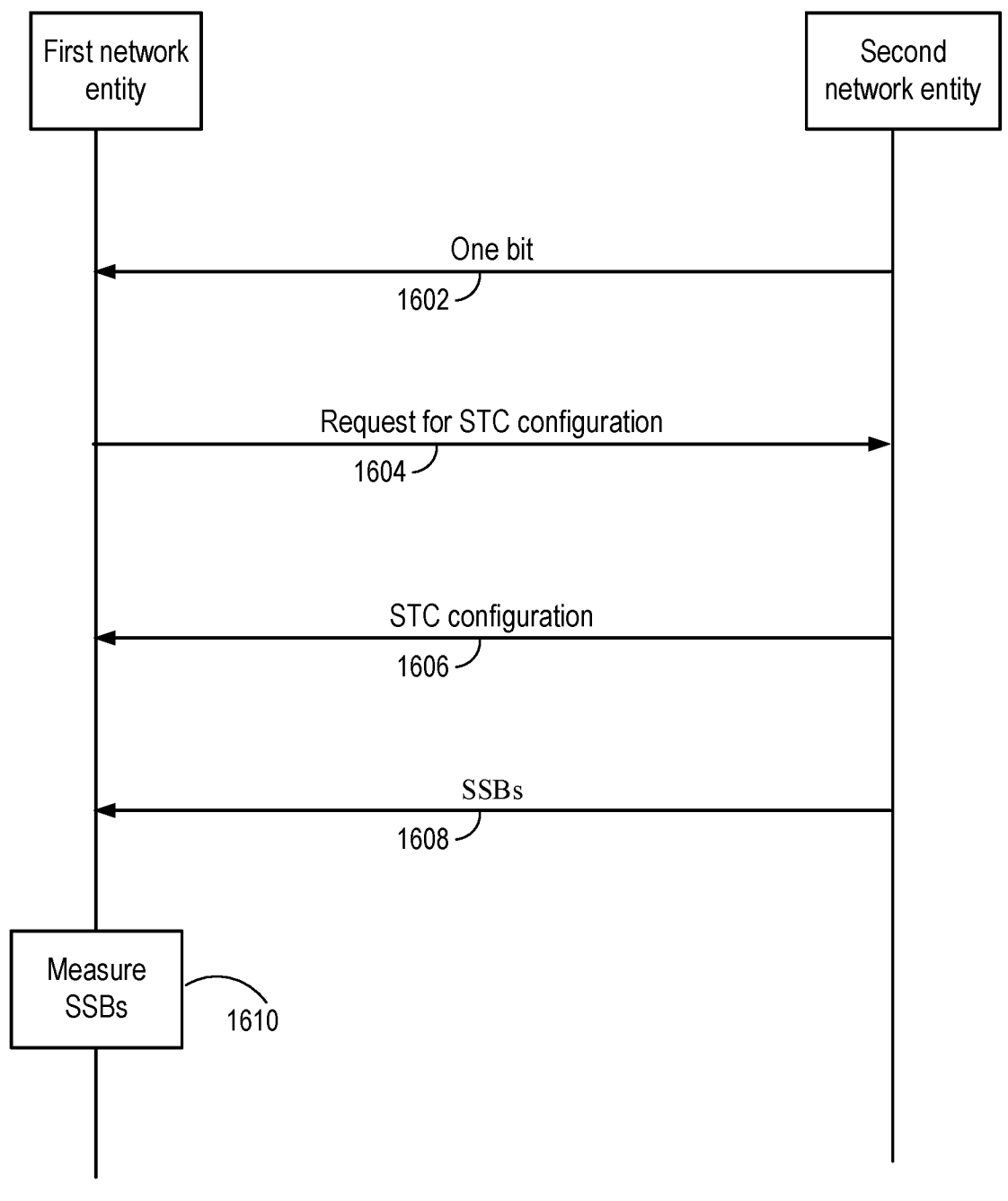

As illustrated in FIG. 16, at 1602, the first network entity receives an indication, e.g., via one or more bits, (instead of the STC configuration) from the second network entity. For example, the first network entity receives the broadcast signaling (e.g., the RMSI) from the second network entity carrying the indication, which indicates that the second network entity has the STC configuration. In certain aspects, some network entities may not have the STC configuration, however, some network entities (e.g. that serve as a parent node or as IAB-distributed unit (DU) connecting with child nodes) may have the STC configuration.

At 1604, the first network entity transmits a request (e.g., on demand request) for the STC configuration of the second network entity to the second network entity. In one example, in response to the received indication, the first network entity may send a random access channel (RACH) signaling (e.g., in an idle mode) carrying the request for the STC configuration of the second network entity to the second network entity. In another example, in response to the received indication, the first network entity may send a scheduling request (SR) indicating the request for the STC configuration of the second network entity to the second network entity. In another example, in response to the received indication, the first network entity may send Uu signaling with mobile termination component (MT)/UE functionality (e.g., in a connected mode) carrying the request for the STC configuration of the second network entity to the second network entity.

In certain aspects, the request may further include a request to transmit aperiodic cross-link interference (CLI) reference signals (RSs) to the first network entity. For example, the first network entity may request the second network entity to send aperiodic inter-gNB CLI RSs for additional measurements (e.g., for refined beam measurements). In one example, if SSB1 of gNB 1 and SSB 5 of gNB 2 are measured with low inter-gNB CLI, the first network entity may further request P2 procedure for measuring coexisting narrow beams quasi-collocated (QCLed) with wide SSB beams.

In certain aspects, the request may further include a request to change a periodicity of transmission of the CLI RSs to the first network entity. For example, the first network entity may request inter-gNB measurement RS periodicity change because of the change in the velocity of the first network entity and/or the second network entity.

In certain aspects, the request may further include a request to switch from a current IAB donor node to a new IAB donor node. For example, if the first network entity needs switching of the current IAB donor node due to the mobility of the first network entity, the first network entity may send the request to switch from the current IAB donor node to the new IAB donor node.

At 1606, the first network entity receives the STC configuration of the second network entity from the second network entity, in response to the request.

At 1608, the second network entity transmits one or more SSBs to the first network entity.

At 1610, the first network entity measures the one or more SSBs from the second network entity, in accordance with the received STC configuration of the second network entity.

Figure 17:
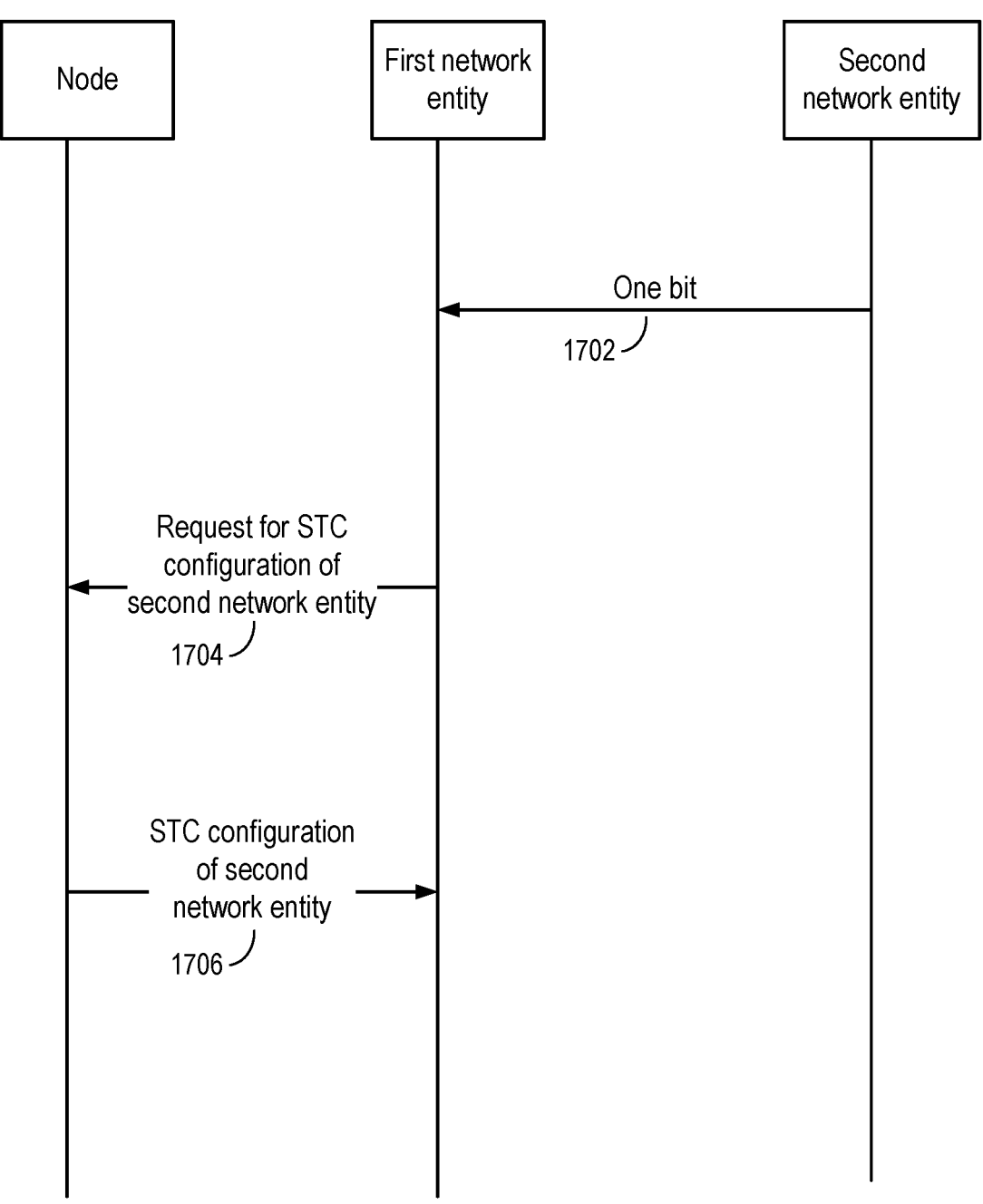

As illustrated in FIG. 17, at 1702, the first network entity receives the indication from the second network entity. As noted above, the indication indicates that the second network entity has the STC configuration.

At 1704, the first network entity transmits a request for the STC configuration of the second network entity to a node (instead of sending it to the second network entity). The request may also include identification (ID) information of the second network entity.

In certain aspects, the request further includes a request to receive aperiodic CLI RSs from the second network entity. In certain aspects, the request further includes a request to change a periodicity of transmission of the CLI RSs from the second network entity.

In one example, the node is a central unit (CU) of an IAB donor node. In another example, the node is an operations administration and management (OAM) node.

At 1706, the first network entity receives the STC configuration of the second network entity from the node.

In certain aspects, the first network entity may receive sidelink signaling from the second network entity carrying the STC configuration of the second network entity. For example, if both the first network entity and the second network entity have sidelink functionality/capability, the second network entity (e.g., neighbor gNB with the sidelink capability) may broadcast to the first network entity via the sidelink signaling (e.g., discovery signaling) the STC configuration of the second network entity.

In certain aspects, when both the first network entity and the second network entity have the sidelink capability, the first network entity may first transmit the sidelink signaling carrying a request for the STC configuration to the second network entity. In response to the request, the first network entity may receive the sidelink signaling from the second network entity carrying the STC configuration of the second network entity. In certain aspects, the request further includes a request to transmit aperiodic CLI RSs to the first network entity. In certain aspects, the request further includes a request to change a periodicity of transmission of the CLI RSs to the first network entity. In certain aspects, the request further includes a request to switch from a current IAB donor node to a new IAB donor node.

In certain aspects, the first network entity may receive signaling configuring an SSB measurement time configuration (SMTC) from the node. The SMTC configuration may include one or more parameters indicating a SMTC window of the first network entity. The first network entity may measure the one or more SSBs from the second network entity during the SMTC window. For example, the CU configures the SMTC window for the first network entity to measure the second network entity STC window.

In certain aspects, the first network entity may detect a number of SSBs from the second network entity. The first network entity may configure an SMTC configuration when the detected at least one SSB is higher than a threshold. The SMTC configuration includes the one or more parameters indicating the SMTC window of the first network entity. The STMC window is aligned with the STC window of the second network entity to measure the one or more SSBs from the second network entity. For example, if the first network entity detects that the SSBs from the second network entity are more than the threshold, the first network entity may self configure the SMTC window to directly measure the second network entity STC window without a delay to wait for the CU.

In certain aspects, to configure the SMTC configuration, the first network entity may update a current SMTC window to a new SMTC window.

In certain aspects, the first network entity may perform beam measurement based on the CLI RSs received from the second network entity. The first network entity may transmit a report to the second network entity or the node indicating beam measurement values to coordinate scheduling (e.g., to avoid high inter-gNB interference transmission/reception).

FIG. 19 illustrates example operations 1900 for wireless communication. The operations 1900 may be performed, for example, by a first network entity (e.g., such as BS 102 in wireless communication network 100 of FIG. 1). The operations 1900 may be implemented as software components that are executed and run on one or more processors (e.g., controller/processor 340 of FIG. 3). Further, transmission and reception of signals by the first network entity in the operations 1900 may be enabled, for example, by one or more antennas (e.g., antennas 334 of FIG. 3). In certain aspects, the transmission and/or reception of signals by the first network entity may be implemented via a bus interface of one or more processors (e.g., the controller/processor 340) obtaining and/or outputting signals.

The operations 1900 begin, at 1902, by obtaining an STC configuration of a second network entity. For example, the network entity may obtain the STC configuration of the second network entity, using antenna(s) and/or receiver/transceiver components of BS 102 shown in FIG. 1 or FIG. 3 and/or of the apparatus shown in FIG. 21.

At 1904, the first network entity measures one or more SSBs transmitted from the second network entity in accordance with the STC configuration. For example, the network entity may measure the one or more SSBs, using antenna(s) and/or receiver/transceiver components of BS 102 shown in FIG. 1 or FIG. 3 and/or of the apparatus shown in FIG. 21.

Note that FIG. 19 is just one example of a method, and other methods including fewer, additional, or alternative steps are possible consistent with this disclosure.

FIG. 20 illustrates example operations 2000 for wireless communication. The operations 2000 may be performed, for example, by a node (e.g., such as BS 102 in wireless communication network 100 of FIG. 1). The operations 2000 may be implemented as software components that are executed and run on one or more processors (e.g., controller/processor 340 of FIG. 3). Further, transmission and reception of signals by the node in the operations 2000 may be enabled, for example, by one or more antennas (e.g., antennas 334 of FIG. 3). In certain aspects, the transmission and/or reception of signals by the node may be implemented via a bus interface of one or more processors (e.g., the controller/processor 340) obtaining and/or outputting signals.

The operations 2000 begin, at 2002, by receiving signaling from a first network entity carrying a request for an STC configuration of a second network entity. For example, the node may receive the signaling carrying the request for the STC configuration, using antenna(s) and/or receiver/transceiver components of BS 102 shown in FIG. 1 or FIG. 3 and/or of the apparatus shown in FIG. 22.

At 2004, the node transmits signaling carrying the STC configuration of the second network entity to the first network entity, in response to the request. For example, the node may transmit the signaling carrying the STC configuration, using antenna(s) and/or transmitter/transceiver components of BS 102 shown in FIG. 1 or FIG. 3 and/or of the apparatus shown in FIG. 22.

Note that FIG. 20 is just one example of a method, and other methods including fewer, additional, or alternative steps are possible consistent with this disclosure.

Example Communications Devices

Figure 21:
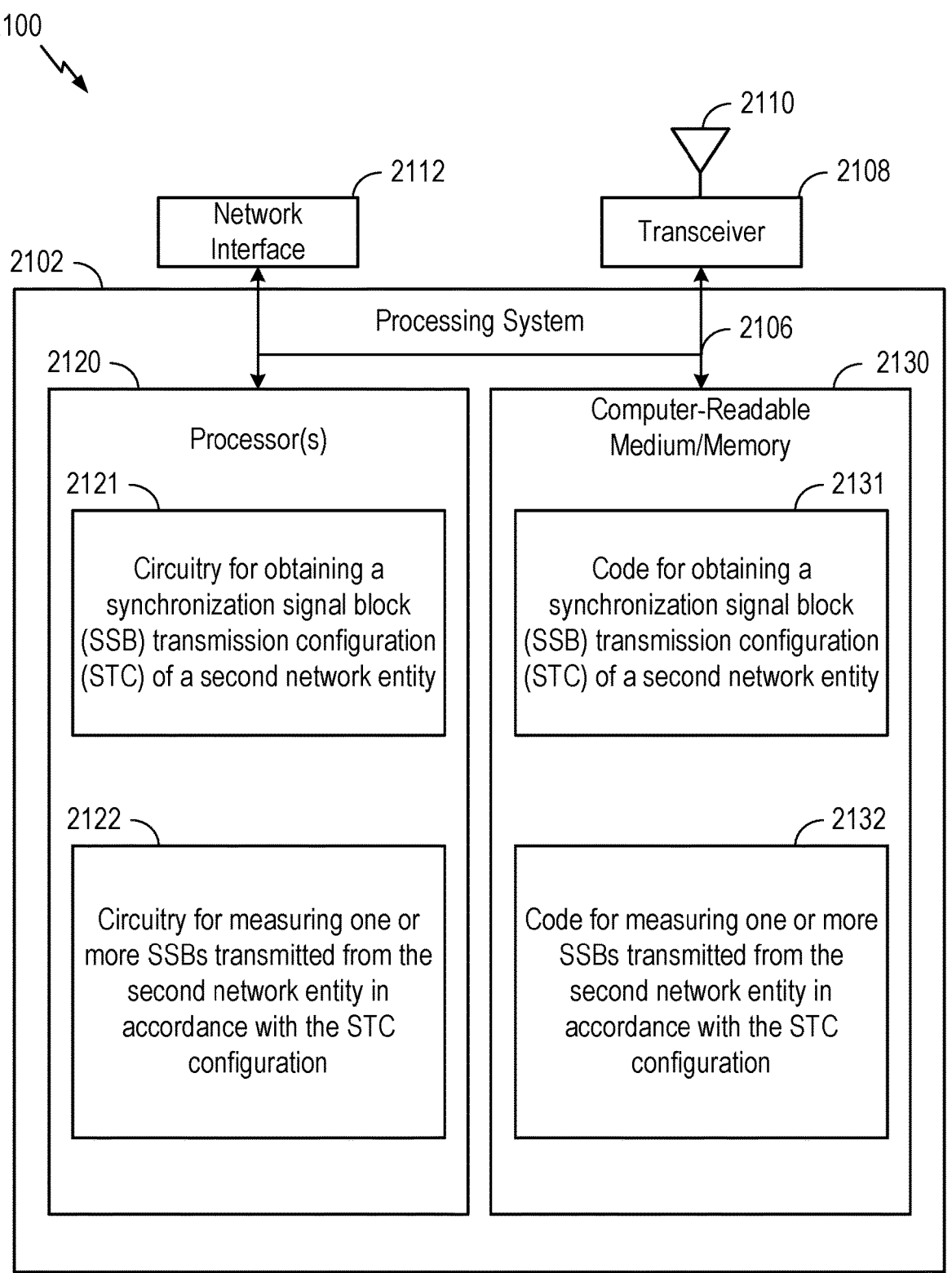
FIGS. 21-22 depict aspects of example communications devices.

FIG. 21 depicts aspects of an example communications device 2100. In some aspects, communications device 2100 is a first network entity, such as BS 102 described above with respect to FIGS. 1 and 3.

The communications device 2100 includes a processing system 2102 coupled to a transceiver 2108 (e.g., a transmitter and/or a receiver) and/or a network interface. The transceiver 2108 is configured to transmit and receive signals for the communications device 2100 via an antenna 2110, such as the various signals as described herein. The network interface 2112 is configured to obtain and send signals for the communications device 2100 via communications link(s), such as a backhaul link, midhaul link, and/or fronthaul link as described herein, such as with respect to FIG. 2. The processing system 2102 may be configured to perform processing functions for the communications device 2100, including processing signals received and/or to be transmitted by the communications device 2100.

The processing system 2102 includes one or more processors 2120. In various aspects, one or more processors 2120 may be representative of one or more of receive processor 338, transmit processor 320, TX MIMO processor 330, and/or controller/processor 340, as described with respect to FIG. 3. The one or more processors 2120 are coupled to a computer-readable medium/memory 2130 via a bus 2106. In certain aspects, the computer-readable medium/ memory 2130 is configured to store instructions (e.g., computer-executable code) that when executed by the one or more processors 2120, cause the one or more processors 2120 to perform the operations 1900 described with respect to FIG. 19, or any aspect related to it. Note that reference to a processor of communications device 2100 performing a function may include one or more processors of communications device 2100 performing that function.

In the depicted example, the computer-readable medium/ memory 2130 stores code (e.g., executable instructions) for obtaining 2131 comprising code for obtaining an STC configuration of a second network entity, and code for measuring 2132 comprising code for measuring one or more SSBs transmitted from the second network entity in accordance with the STC configuration. Processing of the code 2131-2132 may cause the communications device 2100 to perform the operations 1900 described with respect to FIG. 19, or any aspect related to it.

The one or more processors 2120 include circuitry configured to implement (e.g., execute) the code stored in the computer-readable medium/memory 2130, including circuitry for obtaining 2121 comprising circuitry for obtaining an STC configuration of a second network entity, and circuitry for measuring 2122 comprising circuitry for measuring one or more SSBs transmitted from the second network entity in accordance with the STC configuration.

Processing with circuitry 2121-2122 may cause the communications device 2100 to perform the operations 1900 as described with respect to FIG. 19, or any aspect related to it.

Various components of the communications device 2100 may provide means for performing the operations 1900 as described with respect to FIG. 19, or any aspect related to it. Means for transmitting, sending or outputting for transmission may include the transceivers 332 and/or antenna(s) 334 of the BS 102 illustrated in FIG. 3 and/or transceiver 2108 and antenna 2110 of the communications device 2100 in FIG. 21. Means for receiving or obtaining may include the transceivers 332 and/or antenna(s) 334 of the BS 102 illustrated in FIG. 3 and/or transceiver 2108 and antenna 2110 of the communications device 2100 in FIG. 21.

Figure 22:
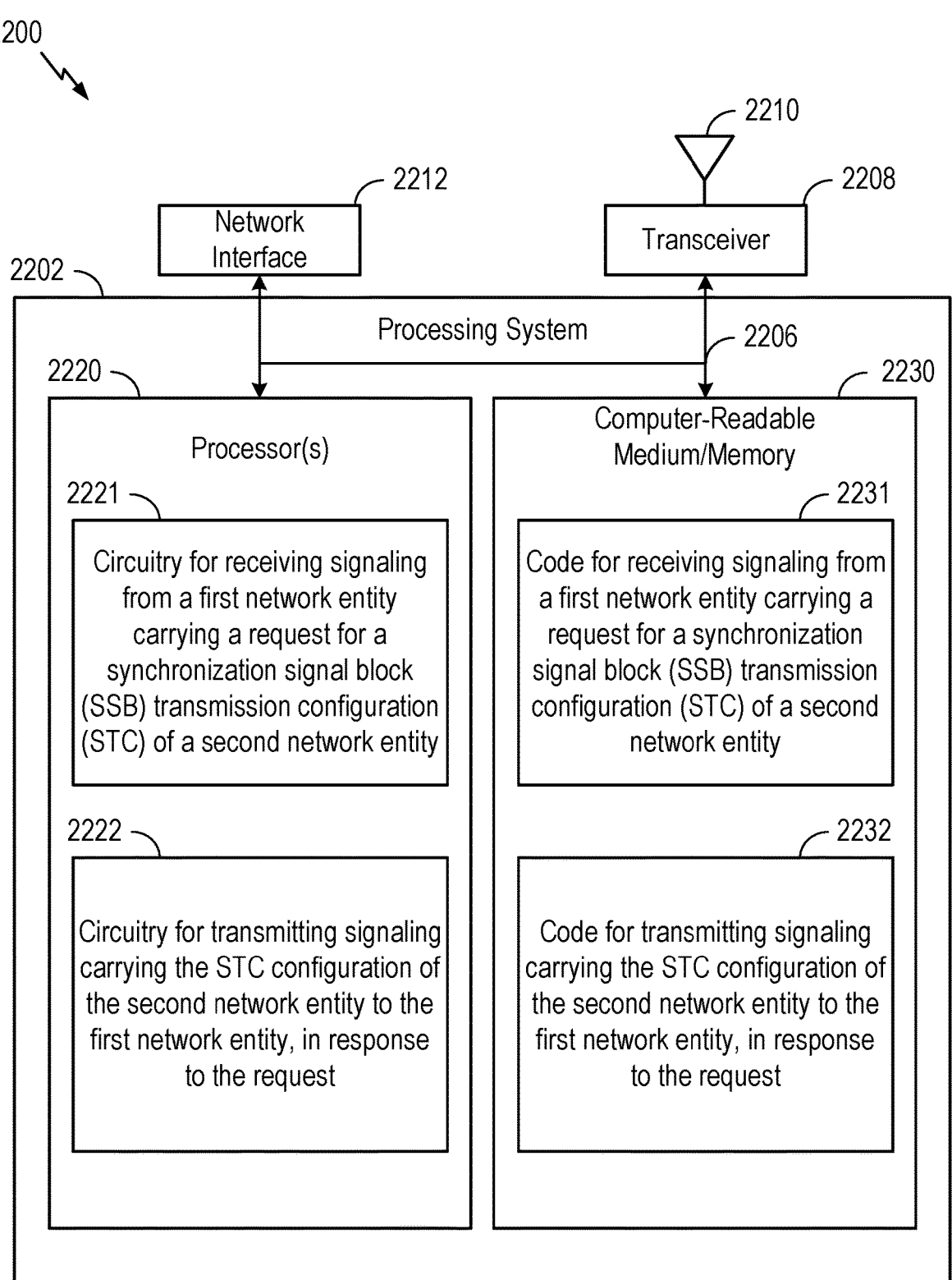

FIG. 22 depicts aspects of an example communications device 2200. In some aspects, communications device 2200 is a node, such as BS 102 described above with respect to FIGS. 1 and 3.

The communications device 2200 includes a processing system 2202 coupled to a transceiver 2208 (e.g., a transmitter and/or a receiver) and/or a network interface. The transceiver 2208 is configured to transmit and receive signals for the communications device 2200 via an antenna 2210, such as the various signals as described herein. The network interface 2212 is configured to obtain and send signals for the communications device 2200 via communications link(s), such as a backhaul link, midhaul link, and/or fronthaul link as described herein, such as with respect to FIG. 2. The processing system 2202 may be configured to perform processing functions for the communications device 2200, including processing signals received and/or to be transmitted by the communications device 2200.

The processing system 2202 includes one or more processors 2220. In various aspects, one or more processors 2220 may be representative of one or more of receive processor 338, transmit processor 320, TX MIMO processor 330, and/or controller/processor 340, as described with respect to FIG. 3. The one or more processors 2220 are coupled to a computer-readable medium/memory 2230 via a bus 2206. In certain aspects, the computer-readable medium/ memory 2230 is configured to store instructions (e.g., computer-executable code) that when executed by the one or more processors 2220, cause the one or more processors 2220 to perform the operations 2000 described with respect to FIG. 20, or any aspect related to it. Note that reference to a processor of communications device 2200 performing a function may include one or more processors of communications device 2200 performing that function.

In the depicted example, the computer-readable medium/ memory 2230 stores code (e.g., executable instructions) for receiving 2231 comprising code for receiving signaling from a first network entity carrying a request for an STC configuration of a second network entity, and code for transmitting 2232 comprising code for transmitting signaling carrying the STC configuration of the second network entity to the first network entity, in response to the request. Processing of the code 2231-2232 may cause the communications device 2200 to perform the operations 2000 described with respect to FIG. 20, or any aspect related to it.

The one or more processors 2220 include circuitry configured to implement (e.g., execute) the code stored in the computer-readable medium/memory 2230, including circuitry for receiving 2221 comprising circuitry for receiving signaling from a first network entity carrying a request for an STC configuration of a second network entity, and circuitry for transmitting 2222 comprising circuitry for transmitting signaling carrying the STC configuration of the second network entity to the first network entity, in response to the request.

Processing with circuitry 2221-2222 may cause the communications device 2200 to perform the operations 2000 as described with respect to FIG. 20, or any aspect related to it.

Various components of the communications device 2200 may provide means for performing the operations 2000 as described with respect to FIG. 20, or any aspect related to it. Means for transmitting, sending or outputting for transmission may include the transceivers 332 and/or antenna(s) 334 of the BS 102 illustrated in FIG. 3 and/or transceiver 2208 and antenna 2210 of the communications device 2200 in FIG. 22. Means for receiving or obtaining may include the transceivers 332 and/or antenna(s) 334 of the BS 102 illustrated in FIG. 3 and/or transceiver 2208 and antenna 2210 of the communications device 2200 in FIG. 22.

EXAMPLE CLAUSES

Implementation examples are described in the following numbered clauses:

Clause 1: A method for wireless communications by a first network entity, comprising: obtaining a synchronization signal block (SSB) transmission configuration (STC) of a second network entity; and measuring one or more SSBs transmitted from the second network entity in accordance with the STC configuration.

Clause 2: The method alone or in combination with the first clause, wherein the first network entity is a mobile integrated access and backhaul (IAB) node or a static IAB node.

Clause 3: The method alone or in combination with the first clause, wherein the second network entity is a mobile integrated access and backhaul (IAB) node or a static IAB node.

Clause 4: The method alone or in combination with the first clause, wherein the obtaining comprises receiving broadcast signaling from the second network entity carrying the STC configuration of the second network entity.

Clause 5: The method alone or in combination with the first clause, wherein the obtaining comprises: receiving signaling carrying an indication from the second network entity, wherein the indication indicates that the second network entity has the STC configuration; transmitting signaling carrying a request for the STC configuration to the second network entity, in response to the received indication; and receiving signaling carrying the STC configuration from the second network entity, in response to the request.

Clause 6: The method alone or in combination with the fifth clause, wherein the request further comprises a request to at least one of: transmit aperiodic cross-link interference (CLI) reference signals (RSs) to the first network entity, change a periodicity of transmission of the CLI RSs to the first network entity, or switch from a current integrated access and backhaul (IAB) donor node to a new IAB donor node.

Clause 7: The method alone or in combination with the first clause, wherein the obtaining comprises: receiving signaling carrying an indication from the second network entity, wherein the indication indicates that the second network entity has the STC configuration; transmitting signaling carrying a request for the STC configuration of the second network entity to a node, in response to the received indication; and receiving signaling carrying the STC configuration of the second network entity from the node, in response to the request.

Clause 8: The method alone or in combination with the seventh clause, wherein the request further comprises identification (ID) information of the second network entity.

Clause 9: The method alone or in combination with the seventh clause, wherein the node is a central unit (CU) of an integrated access and backhaul (IAB) donor node or an operations administration and management (OAM) node.

Clause 10: The method alone or in combination with the seventh clause, wherein the request further comprises a request to at least one of: receive aperiodic cross-link interference (CLI) reference signals (RSs) from the second network entity or change a periodicity of transmission of the CLI RSs from the second network entity.

Clause 11: The method alone or in combination with the first clause, wherein the obtaining comprises receiving sidelink signaling from the second network entity carrying the STC configuration of the second network entity.

Clause 12: The method alone or in combination with the first clause, wherein the obtaining comprises: transmitting sidelink signaling carrying a request for the STC configuration to the second network entity; and receiving sidelink signaling carrying the STC configuration from the second network entity, in response to the request.

Clause 13: The method alone or in combination with the twelfth clause, wherein the request further comprises a request to at least one of: transmit aperiodic cross-link interference (CLI) reference signals (RSs) to the first network entity, change a periodicity of transmission of the CLI RSs to the first network entity, or switch from a current integrated access and backhaul (IAB) donor node to a new IAB donor node.

Clause 14: The method alone or in combination with the first clause, receiving signaling configuring an SSB measurement time configuration (SMTC) from a node, wherein the SMTC configuration comprises one or more parameters indicating at least a SMTC window of the first network entity; and the measuring comprises measuring the one or more SSBs from the second network entity during the SMTC window.

Clause 15: The method alone or in combination with the fourteenth clause, wherein the node is a central unit (CU) of an integrated access and backhaul (IAB) donor node or an operations administration and management (OAM) node.

Clause 16: The method alone or in combination with the first clause, further comprising: detecting a number of SSBs from the second network entity; and configuring an SSB measurement time configuration (SMTC) when a detected at least one SSB is higher than a threshold, wherein the SMTC configuration comprises one or more parameters indicating at least a SMTC window of the first network entity, and wherein the SMTC window is aligned with an STC window of the second network entity to measure the one or more SSBs from the second network entity.

Clause 17: The method alone or in combination with the sixteenth clause, wherein the configuring comprises updating a current SMTC window to a new SMTC window.

Clause 18: The method alone or in combination with the first clause, further comprising: performing beam measurement based on cross-link interference (CLI) reference signals (RSs) received from the second network entity; and transmitting a report, to the second network entity or a node, indicating beam measurement values to coordinate scheduling.

Clause 19: The method alone or in combination with the eighteenth clause, wherein the node is a central unit (CU) of an integrated access and backhaul (IAB) donor node or an operations administration and management (OAM) node.

Clause 20: A method for wireless communications by a node, comprising: receiving signaling from a first network entity carrying a request for a synchronization signal block (SSB) transmission configuration (STC) of a second network entity; and transmitting signaling carrying the STC configuration of the second network entity to the first network entity, in response to the request.

Clause 21: The method alone or in combination with the twentieth clause, wherein the request further comprises identification (ID) information of the second network entity.

Clause 22: The method alone or in combination with the twentieth clause, wherein the node is a central unit (CU) of an integrated access and backhaul (IAB) donor node or an operations administration and management (OAM) node.

Clause 23: The method alone or in combination with the twentieth clause, wherein the first network entity is a mobile integrated access and backhaul (IAB) node or a static IAB node.

Clause 24: The method alone or in combination with the twentieth clause, wherein the second network entity is a mobile integrated access and backhaul (IAB) node or a static IAB node.

Clause 25: The method alone or in combination with the twentieth clause, further comprising: configuring the first network entity with an SSB measurement time configuration (SMTC), wherein the SMTC configuration comprises one or more parameters indicating at least a SMTC window of the first network entity, and wherein the SMTC window is aligned with an STC window of the second network entity to measure one or more SSBs from the second network entity.

Clause 26: An apparatus, comprising: a memory comprising executable instructions; and a processor configured to execute the executable instructions and cause the apparatus to perform a method in accordance with any one of Clauses 1-25.

Clause 27: An apparatus, comprising means for performing a method in accordance with any one of Clauses 1-25.

Clause 28: A non-transitory computer-readable medium comprising executable instructions that, when executed by a processor of an apparatus, cause the apparatus to perform a method in accordance with any one of Clauses 1-25.

Clause 29: A computer program product embodied on a computer-readable storage medium comprising code for performing a method in accordance with any one of Clauses 1-25.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A first network entity configured for wireless communications, comprising:

memory comprising instructions; and one or more processors configured, individually or in any combination, to execute the instructions and cause the first network entity to:

receive, from a second network entity, signaling carrying an indication that indicates that the second network entity has a synchronization signal block (SSB) transmission configuration (STC);

transmit signaling carrying a request for the STC configuration, in response to the received indication;

receive signaling carrying the STC configuration; and measure one or more SSBs transmitted from the second network entity in accordance with the STC configuration.

2. The first network entity of claim 1, wherein the first network entity is a mobile integrated access and backhaul (IAB) node or a static IAB node.

3. The first network entity of claim 1, wherein the second network entity is a mobile integrated access and backhaul (IAB) node or a static IAB node.

4. The first network entity of claim 1, wherein:

the signaling carrying the request for the STC configuration is transmitted to the second network entity; and the signaling carrying the STC configuration is received from the second network entity.

5. The first network entity of claim 4, wherein the request further comprises a request to at least one of: transmit aperiodic cross-link interference (CLI) reference signals (RSs) to the first network entity, change a periodicity of transmission of the CLI RSs to the first network entity, or switch from a current integrated access and backhaul (IAB) donor node to a new IAB donor node.

6. The first network entity of claim 1, wherein:

the signaling carrying the request for the STC configuration of the second network entity is transmitted to a node; and the signaling carrying the STC configuration of the second network entity is received from the node.

7. The first network entity of claim 6, wherein the request further comprises identification (ID) information of the second network entity.

8. The first network entity of claim 6, wherein the node is a central unit (CU) of an integrated access and backhaul (IAB) donor node or an operations administration and management (OAM) node.

9. The first network entity of claim 6, wherein the request further comprises a request to at least one of: receive aperiodic cross-link interference (CLI) reference signals (RSs) from the second network entity or change a periodicity of transmission of the CLI RSs from the second network entity.

10. The first network entity of claim 1, wherein the one or more processors are configured, individually or in any combination, to execute the instructions and cause the first network entity to:
receive signaling configuring an SSB measurement time configuration (SMTC) from a node, wherein the SMTC configuration comprises one or more parameters indicating at least a SMTC window of the first network entity; and
wherein the one or more SSBs from the second network entity are measured during the SMTC window.

11. The first network entity of claim 10, wherein the node is a central unit (CU) of an integrated access and backhaul (IAB) donor node or an operations administration and management (OAM) node.

12. The first network entity of claim 1, wherein the one or more processors are configured, individually or in any combination, to execute the instructions and cause the first network entity to:
detect a number of SSBs from the second network entity; and
configure an SSB measurement time configuration (SMTC) when a detected at least one SSB is higher than a threshold, wherein the SMTC configuration comprises one or more parameters indicating at least a SMTC window of the first network entity, and wherein the SMTC window is aligned with an STC window of the second network entity to measure the one or more SSBs from the second network entity.

13. The first network entity of claim 12, wherein the one or more processors are configured, individually or in any combination, to execute the instructions and cause the first network entity to update a current SMTC window to a new SMTC window.

14. The first network entity of claim 1, wherein the one or more processors are configured, individually or in any combination, to execute the instructions and cause the first network entity to:
perform beam measurement based on cross-link interference (CLI) reference signals (RSs) received from the second network entity; and transmit a report, to the second network entity or a node, indicating beam measurement values to coordinate scheduling.

15. The first network entity of claim 14, wherein the node is a central unit (CU) of an integrated access and backhaul (IAB) donor node or an operations administration and management (OAM) node.

16. A node for wireless communications, comprising:
memory comprising instructions; and
one or more processors configured, individually or in any combination, to execute the instructions and cause the node to:
receive signaling, from a first network entity comprising a first mobile integrated access and backhaul (IAB) node, carrying a request for a synchronization signal block (SSB) transmission configuration (STC) of a second network entity comprising a second mobile IAB node; and
transmit signaling carrying the STC configuration of the second network entity to the first network entity, in response to the request.

17. The node of claim 16, wherein the request further comprises identification (ID) information of the second network entity.

18. The node of claim 16, wherein the node is a central unit (CU) of an integrated access and backhaul (IAB) donor node or an operations administration and management (OAM) node.

19. The node of claim 16, wherein the one or more processors are configured, individually or in any combination, to execute the instructions and cause the node to:
configure the first network entity with an SSB measurement time configuration (SMTC), wherein the SMTC configuration comprises one or more parameters indicating at least a SMTC window of the first network entity, and wherein the SMTC window is aligned with an STC window of the second network entity to measure one or more SSBs from the second network entity.

20. A method for wireless communications by a first network entity, comprising:
transmitting sidelink signaling carrying a request for a synchronization signal block (SSB) transmission configuration (STC) of a second network entity;
receiving sidelink signaling carrying the requested STC configuration from the second network entity; and
measuring one or more SSBs transmitted from the second network entity in accordance with the requested STC configuration.

21. The method of claim 20, wherein the request further comprises a request to at least one of: transmit aperiodic cross-link interference (CLI) reference signals (RSs) to the first network entity, change a periodicity of transmission of the CLI RSs to the first network entity, or switch from a current integrated access and backhaul (IAB) donor node to a new IAB donor node.

* * * * *